(12) United States Patent
Moldestad

(10) Patent No.: US 9,248,882 B2
(45) Date of Patent: *Feb. 2, 2016

(54) TRI-FOLD, VEHICLE CHASSIS

(71) Applicant: Jon P. Moldestad, San Carlos, CA (US)

(72) Inventor: Jon P. Moldestad, San Carlos, CA (US)

(73) Assignee: MDM PRODUCTIVITY, INC., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/498,535

(22) Filed: Sep. 26, 2014

(65) Prior Publication Data

US 2015/0008655 A1     Jan. 8, 2015

Related U.S. Application Data

(63) Continuation of application No. 13/229,652, filed on Sep. 9, 2011, now Pat. No. 8,876,128.

(51) Int. Cl.
  *B62M 1/36* (2013.01)
  *B62M 9/00* (2006.01)
  *B62K 15/00* (2006.01)
  *B62K 3/04* (2006.01)

(52) U.S. Cl.
  CPC ............. *B62K 15/008* (2013.01); *B62K 3/04* (2013.01); *B62M 1/36* (2013.01); *B62M 9/00* (2013.01); *B62K 2015/003* (2013.01)

(58) Field of Classification Search
  CPC .... B62K 15/008; B62K 15/00; B62K 15/006; B62K 2015/003; B62K 21/00; B62K 3/005; A63B 22/0605; A63B 2210/50; A63B 24/0062; B62M 1/36; B62M 1/12; H02J 7/025; H02J 7/0042; Y02T 10/7005; Y02T 90/14

USPC .................................. 280/40, 259, 261, 278
  See application file for complete search history.

(56) References Cited

U.S. PATENT DOCUMENTS

| | | | |
|---|---|---|---|
| 567,161 | A | 9/1876 | Le Grand |
| 652,988 | A | 9/1899 | Wells |
| 1,276,139 | A | 3/1916 | Warren |
| 2,384,139 | A | 8/1943 | Schwinn |
| 3,303,720 | A | 2/1967 | Jaulmes |
| 3,588,144 | A | 6/1971 | Padial |

(Continued)

FOREIGN PATENT DOCUMENTS

| | | |
|---|---|---|
| DE | 3112768 | 10/1982 |
| GB | 2038735 | 7/1980 |

(Continued)

OTHER PUBLICATIONS

International Search Report for PCT/US2011/051129, May 2, 2012, MDM Productivity, LLC.

(Continued)

*Primary Examiner* — J. Allen Shriver, II
*Assistant Examiner* — Bridget Avery
(74) *Attorney, Agent, or Firm* — Brian S. Boyer; Syndicated Law, PC

(57) ABSTRACT

A compact vehicle drive mechanisms that can be used in the design of a foldable, carry-on vehicle. The compact drive mechanisms presented herein, for example, have contributed to the advent of the compact, carry-on bicycles set-forth in the teachings which include drive-and-steering units and drive-and-chassis units.

21 Claims, 15 Drawing Sheets

(56) References Cited

U.S. PATENT DOCUMENTS

| | | | |
|---|---|---|---|
| 3,746,367 A | 7/1973 | Johannsen | |
| 3,862,725 A | 1/1975 | Gename | |
| 3,979,136 A | 9/1976 | Lassiere | |
| 4,093,260 A | 6/1978 | Terzian et al. | |
| 4,132,426 A | 1/1979 | Svoboda et al. | |
| 4,132,428 A | 1/1979 | Lassiere | |
| 4,182,522 A | 1/1980 | Ritchie | |
| 4,279,429 A | 7/1981 | Hopkins | |
| 4,296,940 A | 10/1981 | Herbert | |
| 4,422,663 A | 12/1983 | Hon | |
| 4,429,890 A | 2/1984 | Hon | |
| 4,507,105 A | 3/1985 | Stottmann et al. | |
| 4,598,923 A | 7/1986 | Csizmadia | |
| 4,611,818 A | 9/1986 | Cammarata | |
| 4,634,138 A | 1/1987 | Fryer et al. | |
| 4,773,663 A | 9/1988 | Sawyer et al. | |
| 4,842,292 A | 6/1989 | Wang | |
| 4,887,827 A | 12/1989 | Heggie | |
| 4,895,386 A | 1/1990 | Hellestam et al. | |
| 4,909,537 A | 3/1990 | Tratner | |
| 5,242,028 A | 9/1993 | Murphy et al. | |
| 5,273,300 A | 12/1993 | Wells | |
| 5,284,351 A | 2/1994 | Fleishman | |
| 5,314,207 A | 5/1994 | Camfield et al. | |
| 5,441,290 A | 8/1995 | Morgan et al. | |
| 5,486,015 A | 1/1996 | Lau | |
| 5,730,670 A | 3/1998 | Ferrarin | |
| 5,823,554 A | 10/1998 | Lau | |
| 5,853,062 A | 12/1998 | Hulett | |
| 5,873,590 A | 2/1999 | Abe et al. | |
| 6,003,890 A | 12/1999 | Inouye | |
| 6,196,566 B1 | 3/2001 | Zhang | |
| 6,267,401 B1 | 7/2001 | De Jong | |
| 6,273,442 B1 | 8/2001 | Fallon et al. | |
| 6,425,598 B2 | 7/2002 | Murayama | |
| 6,453,766 B1 | 9/2002 | Ose et al. | |
| 6,520,525 B1 | 2/2003 | Yoon | |
| 6,568,038 B2 | 5/2003 | Patelli et al. | |
| 6,581,494 B2 | 6/2003 | Sechler | |
| 6,581,949 B2 | 6/2003 | Lopez | |
| 6,637,292 B2 | 10/2003 | Chu | |
| 6,641,159 B1 | 11/2003 | Fan | |
| 6,769,708 B2 | 8/2004 | Ackerly | |
| 6,799,771 B2 | 10/2004 | Bigot | |
| 6,848,699 B2 | 2/2005 | Chen | |
| 6,968,754 B2 | 11/2005 | Bandarra | |
| 7,048,289 B2 | 5/2006 | Lau | |
| 7,097,597 B2 | 8/2006 | Tamian | |
| 7,114,737 B1 | 10/2006 | Rasmussen | |
| 7,140,629 B2 | 11/2006 | Chen | |
| 7,159,884 B2 | 1/2007 | Gu | |
| 7,210,696 B2 | 5/2007 | Kettler | |
| 7,228,761 B1 | 6/2007 | Chen | |
| 7,229,089 B2 | 6/2007 | Mihelic | |
| 7,232,144 B2 | 6/2007 | Colman | |
| 7,284,631 B2 | 10/2007 | Rizzetto | |
| 7,288,048 B2 | 10/2007 | Lin | |
| 7,300,066 B2 | 11/2007 | Kettler | |
| 7,306,249 B2 | 12/2007 | Kwok et al. | |
| 7,314,226 B1 | 1/2008 | Hsu | |
| 7,341,268 B2 | 3/2008 | Lin | |
| 7,367,576 B2 | 5/2008 | Pan | |
| 7,445,224 B2 | 11/2008 | Whyte | |
| 7,490,842 B1 | 2/2009 | Ulrich et al. | |
| 7,510,202 B1 | 3/2009 | Shiao | |
| 7,584,978 B2 | 9/2009 | Pourias | |
| 7,614,632 B2 | 11/2009 | Tak-Wei Hon | |
| 7,651,109 B2 | 1/2010 | Tong | |
| 7,658,252 B2 | 2/2010 | Shapiro | |
| 7,828,312 B1 | 11/2010 | Yeh | |
| 8,016,311 B1 | 9/2011 | Hadzicki et al. | |
| 8,162,345 B1 | 4/2012 | Szu-Yao | |
| 8,256,784 B2 | 9/2012 | Hadzicki et al. | |
| 8,348,294 B1 | 1/2013 | Moldestad | |
| 8,459,678 B2 | 6/2013 | Moldestad | |
| 8,464,609 B2 | 6/2013 | Shiu | |
| 8,480,113 B2 | 7/2013 | Moldestad | |
| 8,646,801 B2 | 2/2014 | Moldestad | |
| 8,707,825 B2 | 4/2014 | Shiu | |
| 8,714,576 B2 | 5/2014 | Moldestad | |
| 8,746,722 B2 | 6/2014 | Moldestad | |
| 8,887,852 B2 * | 11/2014 | Schaap | 180/208 |
| 8,915,512 B2 * | 12/2014 | Kim | 280/287 |
| 2001/0023211 A1 | 9/2001 | Bowman | |
| 2002/0105161 A1 | 8/2002 | Park | |
| 2002/0109330 A1 | 8/2002 | Tompsett | |
| 2003/0094072 A1 | 5/2003 | Chen | |
| 2003/0213630 A1 | 11/2003 | Pyntikov | |
| 2004/0032110 A1 | 2/2004 | Bigot | |
| 2004/0090039 A1 | 5/2004 | Borochov et al. | |
| 2005/0110239 A1 | 5/2005 | Michelae et al. | |
| 2006/0097476 A1 | 5/2006 | Kobayashi | |
| 2006/0125205 A1 | 6/2006 | Lai | |
| 2006/0232040 A1 | 10/2006 | Franco | |
| 2006/0244237 A1 | 11/2006 | Chuang | |
| 2007/0065784 A1 | 3/2007 | Nix | |
| 2007/0069499 A1 | 3/2007 | Lin | |
| 2007/0187922 A1 | 8/2007 | Boutakis | |
| 2007/0205577 A1 | 9/2007 | Lau | |
| 2007/0210556 A1 | 9/2007 | Hon et al. | |
| 2007/0273126 A1 | 11/2007 | Pourias | |
| 2007/0290479 A1 | 12/2007 | Tong | |
| 2008/0164675 A1 | 7/2008 | Ma | |
| 2009/0146391 A1 | 6/2009 | Sutherland | |
| 2009/0256330 A1 | 10/2009 | Daniels | |
| 2010/0206652 A1 | 8/2010 | Kielland | |
| 2011/0025016 A1 | 2/2011 | Waaijer | |
| 2011/0042156 A1 | 2/2011 | Vencenz | |
| 2011/0198822 A1 | 8/2011 | Jessie | |
| 2011/0254252 A1 | 10/2011 | Hsieh et al. | |
| 2012/0273287 A1 | 11/2012 | Song | |
| 2013/0062842 A1 | 3/2013 | Moldestad | |
| 2014/0175769 A1 | 6/2014 | Moldestad | |
| 2014/0186803 A1 | 7/2014 | Shiu | |

FOREIGN PATENT DOCUMENTS

| | | |
|---|---|---|
| JP | 59-014862 | 1/1984 |
| JP | 08133160 | 5/1996 |
| JP | 2002-145157 | 5/2002 |
| JP | 2011/068278 | 4/2011 |
| WO | WO 2011/098887 | 8/2011 |
| WO | PCT/US2011/051129 | 9/2011 |
| WO | PCT/US2013/028949 | 3/2013 |

OTHER PUBLICATIONS www.alibaba.com, Electric Bike Wheel, [online] [retrieved on Aug. 3, 2011] URL: www.alibaba.com/product-gs/202978144/electric_bike_wheel.html.

amazon.com, Playskool Glide to Ride Bike Girl, [online] [retrieved on Aug. 13, 2010] URL: http://www.amazon.com/Playskool-Glide-Ride-Bike-Girl/dp/B00196VBIO.

Bossbi, BMW kid's bike, [online] [retrieved on Aug. 13, 2010] URL: http://www.bossbi.com/bike/bmw/bmwbikes.php.

www.cyclingnews.com, Fitted up Front is Cannondale's Fatty Solo Fork, [online] [retrieved on Jun. 15, 2011] URL: www.cyclingnews.com/features/photos/on-show-eurobike-2009-part-6/86783.

Road CC, Original Dahon—that folding crank, [online] [retrieved on Aug. 13, 2010] URL: http://road.cc/content/original-dahon-folding-crank.

Sheldon Brown, Cottered Cranks, [online] [retrieved on Aug. 13, 2010] URL: http://www.sheldonbrown.com/cotters.html.

Skuut, [online] [retrieved on Aug. 13, 2010] URL: http://www.skuut.com/.

www.youtube.com, Automatic Bicycle, Transmission (IVT), [online] [retrieved on Jan. 28, 2011] URL: www.youtube.com/watch?v=cd2-vsTzd9E.

* cited by examiner

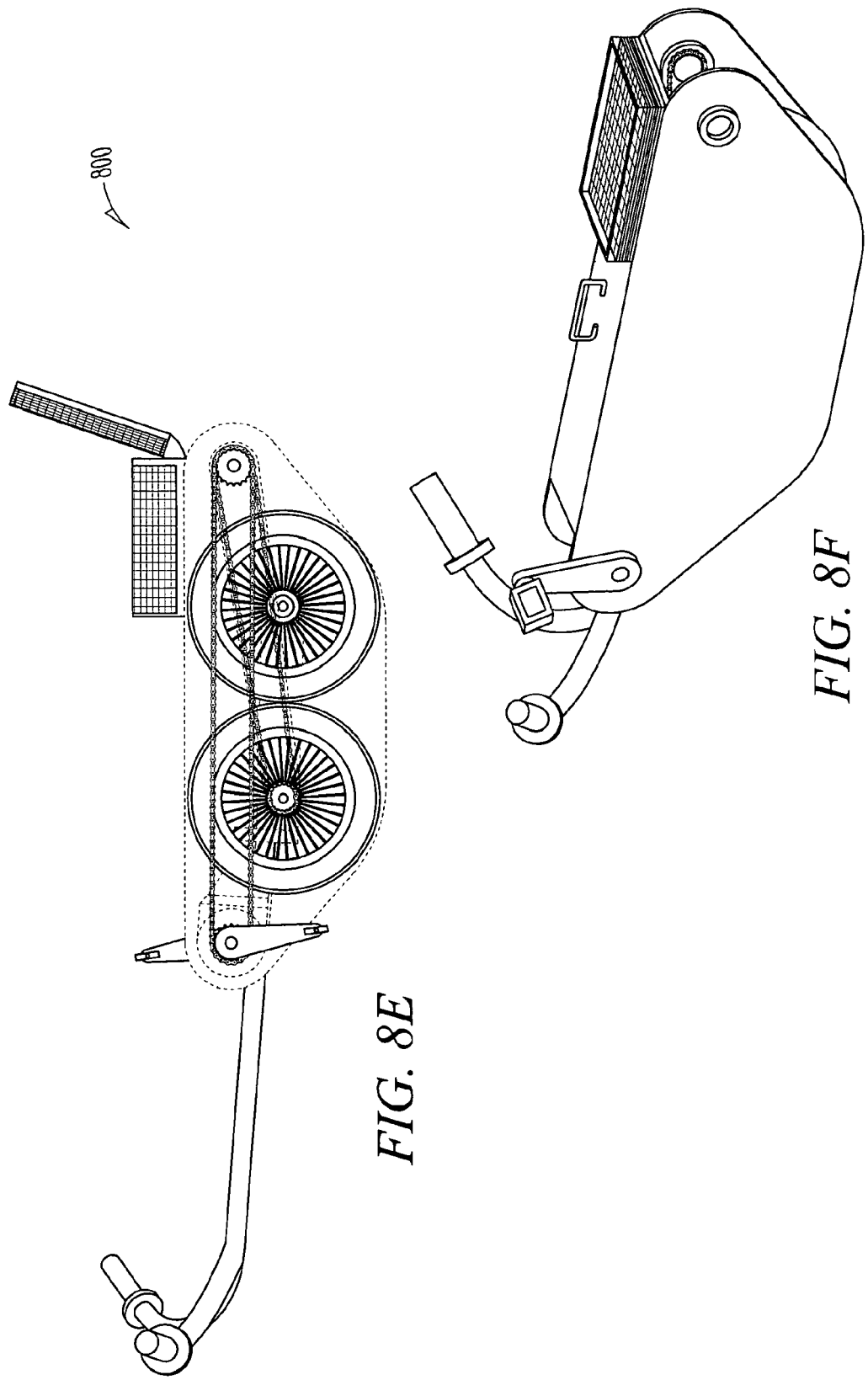

TRI-FOLD, VEHICLE CHASSIS

CROSS-REFERENCE TO RELATED APPLICATIONS

This application is a continuation of U.S. application Ser. No. 13/229,652, filed Sep. 9, 2011, which is hereby incorporated herein by reference in it's entirety.

BACKGROUND

1. Field of the Invention

The teachings provided herein are generally directed to compact vehicle drive mechanisms that can be used in the design of a foldable, carry-on vehicle.

2. Description of the Related Art

Vehicles used for transportation generally all expose the user to some transfer of mechanical lubricants from the vehicle to the user, such as oil and grease, for example. Automobiles have generally done a good job of reducing the user's exposure to such lubricants by enclosing areas of the automobile that introduce this problem to the user. Other vehicles still create this problem, as their design inherently exposes the user to such lubricants.

Bicycles, for example, are almost exclusively driven by chain sets, and the conventional lightweight construction of bicycles limit the extent to which the user can be protected from the chain sets and still maintain the desired weight and performance of the bicycle.

Moreover, the use of bicycles is limited by the ability to carry and store the bicycles. For example, a user of mass transit, such as trains, buses, taxi's, and even airplanes and boats, needs to carry-on the bicycle in some way, and not all mass transit systems can accept traditional bicycles. Folding bicycles exist, but they still remain greasy, large, and heavy, as well as introduce shear and pinch points that can be dangerous to the user.

Accordingly, and for at least the above reasons, one of skill would appreciate a vehicle having a drive mechanism that is (i) compact, (ii) at least substantially enclosed, (iii) clean, and (iv) generally shielded from contact by the user during normal use. Moreover, one of skill will appreciate a folding bicycle that collapses into its own chassis, with little to no nip, pinch and shear points, in a complementary configuration to form a compact, carry-on bicycle, the chassis functioning as a protective, carry-on casing. Such a folding bicycle will be considered particularly useful in a size that is similar to a piece of carry-on luggage.

SUMMARY

The teachings provided herein are generally directed to compact vehicle drive mechanisms can be used in the design of a foldable, carry-on vehicle. The compact drive mechanisms presented herein, for example, have contributed to the advent of the compact, carry-on bicycles set-forth in the teachings which include drive-and-steering units and drive-and-chassis units.

In some embodiments, for example, the teachings are directed to a compact, combination drive-and-steering unit for a vehicle, the unit having a shared rotational space comprising a portion of a drive assembly and a portion of a steering assembly. The drive assembly can include a crankshaft having a crank axis that rotates in a fixed position relative to a chassis of a vehicle powered by the crankshaft. The crankshaft can be in an operable communication with a spool-shaft having a drive axis, the spool-shaft in an operable communication with a drive member. The drive member can be in an operable communication with a wheel assembly having a wheel, the drive assembly transferring a power from the crankshaft to drive the wheel. The steering assembly can include a strut in an operable communication with the wheel assembly, a steering axle in an operable communication with the strut, and a steering member in an operable communication with the steering axle. The steering axle can have a steering axis that is concentric to the drive axis of the spoolshaft in the shared rotational space, the spoolshaft circumscribing at least a portion of the steering axle. The steering axle can rotate freely, or substantially freely, within the spoolshaft, such that the crankshaft rotates in the fixed position independent, or substantially independent, of a rotation of the steering axle. The shared rotational space creates a compact, combination drive-and-steering unit for the vehicle.

It should be appreciated that the drive member, in the embodiments set-forth herein, can be any operable connection that transfers power to the wheel. In some embodiments, the drive member comprises a linkshaft. In some embodiments, the drive member comprises a chain. And, in some embodiments, the drive member comprises a belt.

It should be appreciated that the steering member, in the embodiments set-forth herein, can be any means for directing a steering of the vehicle. In some embodiments, the steering member is a handlebar.

It should be appreciated that the vehicle, in the embodiments set-forth herein, can be any vehicle that can benefit from the teachings provided herein. In some embodiments, the vehicle is a bicycle. And, in some embodiments, the vehicle is a folding bicycle.

It should be appreciated that a strut can be a structural member that is used to operably attach a wheel assembly to a vehicle chassis. One of skill will appreciate that a strut can include a fork. Moreover, in some embodiments, a strut can comprise a unifork.

The drive-and-steering unit can be powered using any means known to one of skill. For example, the drive-and-steering unit can further comprise an electric motor in an operable communication with the crankshaft. Likewise, the teachings are also directed to a compact, combination drive-and-steering unit for a pedal-powered vehicle. In these embodiments, the drive-and-steering unit can include a shared rotational space, the space comprising a portion of a drive assembly and a portion of a steering assembly. The drive assembly can include a pair of pedals attached to a pair of crankarms, the pair of crankarms attached to a crankshaft, the crankshaft having a crank axis that rotates in a fixed position under a pedal power relative to a chassis. The crankshaft can be in an operable communication with a spool-shaft having a drive axis, the spool-shaft in an operable communication with a drive member, and the drive member in an operable communication with a wheel assembly having a wheel. In these embodiments, the drive assembly transfers the pedal power from the crankshaft to drive the wheel. The steering assembly can include a strut in an operable communication with the wheel assembly, a steering axle in an operable communication with the strut, and a steering member in an operable communication with the steering axle. The steering axle can have a steering axis that is concentric to the drive axis of the spoolshaft in the shared rotational space, the spoolshaft circumscribing at least a portion of the steering axle. The steering axle can rotate freely, or substantially freely, within the spoolshaft, such that the crankshaft rotates in the fixed position independent, or substantially independent, of a rotation of the steering axle. And, the shared rotational space can create a compact, combination drive-and-steering unit for the pedal-powered vehicle.

The compact drive mechanism can also include a portion of the chassis. In some embodiments, for example, the teachings are directed to a compact, combination drive-and-chassis unit for a vehicle. The unit comprises a shared chassis space comprising at least a portion of a chassis assembly that encloses at least a substantial portion of a drive assembly. The drive assembly includes a crankshaft having a crank axis, the crankshaft in an operable communication with a drive member. The drive member can be in an operable communication with a wheel assembly having a wheel, the drive assembly transferring a power from the crankshaft to drive the wheel. The portion of the chassis assembly can function as a protective casing for the substantial portion of the drive assembly, the substantial portion of the drive assembly comprising the crankshaft and at least a substantial portion of the drive member. The drive member can have at least one fixably rotatable pivot point corresponding to a fixably rotatable joint in the chassis assembly for at least one re-direction of the power from the crankshaft to the wheel. And, the shared chassis space can create a compact, combination drive-and-chassis unit for the vehicle.

The chassis can further comprise a rear strut having a proximal end and a distal end, the proximal end attaching to the remainder of the chassis at a rotatably-lockable rear strut pivot at the fixably rotatable joint, and the distal end operably attaching to the wheel assembly.

As with the combined drive-and-steering unit above, it should be appreciated that the drive member, in the embodiments set-forth herein, can be any operable connection that transfers power to the wheel. In some embodiments, the drive member comprises a linkshaft. In some embodiments, the drive member comprises a chain. And, in some embodiments, the drive member comprises a belt. Likewise, as with the combined drive-and-steering unit above, it should be appreciated that the steering member, in the embodiments set-forth herein, can be any means for directing a steering of the vehicle. In some embodiments, the steering member is a handlebar. Likewise, as with the combined drive-and-steering unit above, the vehicle can be any vehicle that can benefit from the combination drive-and-chassis unit. In some embodiments, the vehicle is a bicycle. And, in some embodiments, the vehicle is a folding bicycle. Moreover, as with the combined drive-and-steering unit above, it should be appreciated that a strut can be a structural member that is used to operably attach a wheel assembly to a vehicle chassis. Again, one of skill will appreciate that a strut can include a fork and, in some embodiments, a strut can comprise a unifork.

As with the drive-and-steering unit, the drive-and-chassis unit can be powered using any means known to one of skill. For example, the drive-and-chassis unit can further comprise an electric motor in an operable communication with the crankshaft. Likewise, the teachings are also directed to a compact, combination drive-and-chassis unit for a pedal-powered vehicle. In these embodiments, the drive-and-chassis unit can comprise a shared chassis space comprising at least a portion of a chassis assembly that encloses at least a substantial portion of a drive assembly. The drive assembly can include a pair of pedals attached to a pair of crankarms, the pair of crankarms attached to a crankshaft. The crankshaft can have a crank axis and be in an operable communication with a drive member, the drive member in an operable communication with a wheel assembly having a wheel. And, the drive assembly can transfer a pedal power from the crankshaft to drive the wheel. In these embodiments, the portion of the chassis assembly can function as a protective casing for the substantial portion of the drive assembly, the substantial portion of the drive assembly comprising the crankshaft and at least a substantial portion of the drive member. The drive member can have at least one fixably rotatable pivot point corresponding to a fixably rotatable joint in the chassis assembly for at least one re-direction of the power from the crankshaft to the wheel. And, the shared chassis space can create a compact, combination drive-and-chassis unit for the vehicle.

The power can be transferred from the crank to the wheel through a chain set. As such, in some embodiments, the teachings are directed to a compact, combination drive-and-chassis unit for a pedal-powered vehicle that includes a chain set. In these embodiments, a shared chassis space comprises at least a portion of a chassis assembly that encloses at least a substantial portion of a drive assembly. The drive assembly can include a pair of pedals attached to a pair of crankarms, the pair of crankarms attached to a crankshaft. The crankshaft can have a crank axis and a first sprocket. The crankshaft can be in an operable communication with a chain set having a roller chain and a second sprocket having a second sprocket axis, the chain set in an operable communication with a wheel assembly having a wheel, and a third sprocket. And, the drive assembly can transfer a pedal power from the crankshaft to drive the wheel. In some embodiments, the portion of the chassis assembly can function as a protective casing for the substantial portion of the drive assembly, the substantial portion of the drive assembly comprising the crankshaft and at least a substantial portion of the drive member. The chain set can have a fixably rotatable pivot point at the second sprocket axis corresponding to a fixably rotatable joint in the chassis assembly for a re-direction of the pedal power from the crankshaft to the second sprocket, and from the second sprocket to the wheel. And, the shared chassis space can create a compact, combination drive-and-chassis unit for the vehicle.

The teachings are also directed to any of a variety of bicycles having the features discussed above. In some embodiments, the teachings are directed to a folding bicycle with an enclosed, front-wheel shaft-drive. These embodiments can have a shared rotational space including (i) a portion of a drive assembly and (ii) a portion of a steering assembly, as well as a folding chassis including (iii) a rotatably-lockable front strut supporting a front wheel assembly having a front wheel, and (iv) a rotatably-lockable rear strut supporting a rear wheel assembly having a rear wheel. The drive assembly can include a pair of pedals attached to a pair of crankarms, the pair of crankarms attached to a crankshaft. The crankshaft can have a crank axis that rotates under a pedal power in a fixed position in the chassis, the crankshaft in an operable communication with a spool-shaft having a drive axis. The spool-shaft can be in an operable communication with a drive member, and the drive member can be in an operable communication with the front wheel. The drive assembly can transfer the pedal power from the crankshaft to drive the front wheel. The steering assembly can include the front strut in an operable communication with the front wheel assembly, a steering axle in an operable communication with the front strut, and a steering member in an operable communication with the steering axle. The steering axle can have a steering axis that is concentric to the drive axis of the spoolshaft in the shared rotational space, the spoolshaft circumscribing at least a portion of the steering axle. The steering axle can rotate freely, or substantially freely, within the spoolshaft, such that the crankshaft rotates in the fixed position independent, or substantially independent, of a rotation of the steering axle. The front strut can have a proximal end and a distal end, the proximal end of the front strut attaching to the chassis at a rotatably-lockable front strut pivot. The rear strut can have a proximal end and a distal end, the proximal end of the rear strut attaching to the chassis at a rotatably-lockable rear strut pivot. And, the shared rotational space can create a compact, combination drive-and-steering unit for the pedal-powered vehicle.

In some embodiments, the front strut can be releasably-lockable in a plurality of positions. And, in some embodiments, the rear strut can be releasably-lockable in a plurality of positions. In some embodiments, the front strut is a unifork, the rear strut is a unifork that is complementary in shape to the front strut, such that the front strut, the front wheel assembly, the rear strut, and the rear wheel assembly can collapse into the chassis in a complementary configuration to form a compact, carry-on bicycle.

In some embodiments, the chassis functions as a protective casing for the crankshaft, the spool-shaft, and the drive member during an operation of the bicycle. And, in some embodiments, the chassis functions as a protective casing for the crankshaft, the spool-shaft, the drive member, the front strut, the front wheel assembly, the rear strut, and the rear wheel assembly during a collapse of the bicycle.

In some embodiments, the steering member can be a collapsibly lockable handlebar. And, in some embodiments, the bicycle can further comprise a collapsibly lockable seat. Moreover, in some embodiments, the bicycle can weigh less than 10 pounds.

Likewise, a bicycle can have the drive-and-chassis unit. As such, the teachings are also directed to a compact, carry-on bicycle with an enclosed, drive assembly. In these embodiments, the bicycle can include a shared chassis space comprising (i) at least a portion of a chassis assembly that encloses (ii) at least a substantial portion of a drive assembly, as well as a folding chassis including (iii) a rotatably-lockable front strut supporting a front wheel assembly having a front wheel, and (iv) a rotatably-lockable rear strut supporting a rear wheel assembly having a rear wheel. The drive assembly can include a pair of pedals attached to a pair of crankarms, the pair of crankarms attached to a crankshaft. The crankshaft can have a crank axis that rotates under a pedal power in a fixed position in the chassis, the crankshaft in an operable communication with a spool-shaft having a drive axis. The spool-shaft can be in an operable communication with a drive member, and the drive member in an operable communication with the front wheel, the drive assembly transferring the pedal power from the crankshaft to drive the front wheel. The portion of the chassis assembly can function as a protective casing for the substantial portion of the drive assembly, the substantial portion of the drive assembly comprising the crankshaft and at least a substantial portion of the drive member. The drive member can have a fixably rotatable pivot point corresponding to a fixably rotatable joint in the chassis assembly for a re-direction of the pedal power from the crankshaft to the pivot point and from the pivot point to the wheel. The front strut can have a proximal end and a distal end, the proximal end of the front strut attaching to the chassis at a rotatably-lockable front strut pivot. The rear strut can have a proximal end and a distal end, the proximal end of the rear strut attaching to the chassis at a rotatably-lockable rear strut pivot. And, the shared chassis space can create a compact, combination drive-and-steering unit for the pedal-powered vehicle.

In some embodiments, the front strut can be releasably-lockable in a plurality of positions. Likewise, in some embodiments, the rear strut can be releasably-lockable in a plurality of positions. The result of the releasably-lockable struts is a variability in wheel base and/or height of the bicycle.

As with the bicycle having the combination drive-and-steering unit, the front strut can be a unifork, and the rear strut can be a unifork that is complementary in shape to the front strut, such that the front strut, the front wheel assembly, the rear strut, and the rear wheel assembly collapse into the chassis in a complementary configuration to form a compact, carry-on bicycle. Likewise, the chassis can function as a protective casing for the crankshaft, the drive member, the front strut, the front wheel assembly, the rear strut, and the rear wheel assembly during a collapse of the bicycle.

BRIEF DESCRIPTION OF THE FIGURES

FIGS. 8A-8F illustrate a bicycle having a drive-and-chassis unit, according to some embodiments.

DETAILED DESCRIPTION

Figures 1A, 1B, 1C:
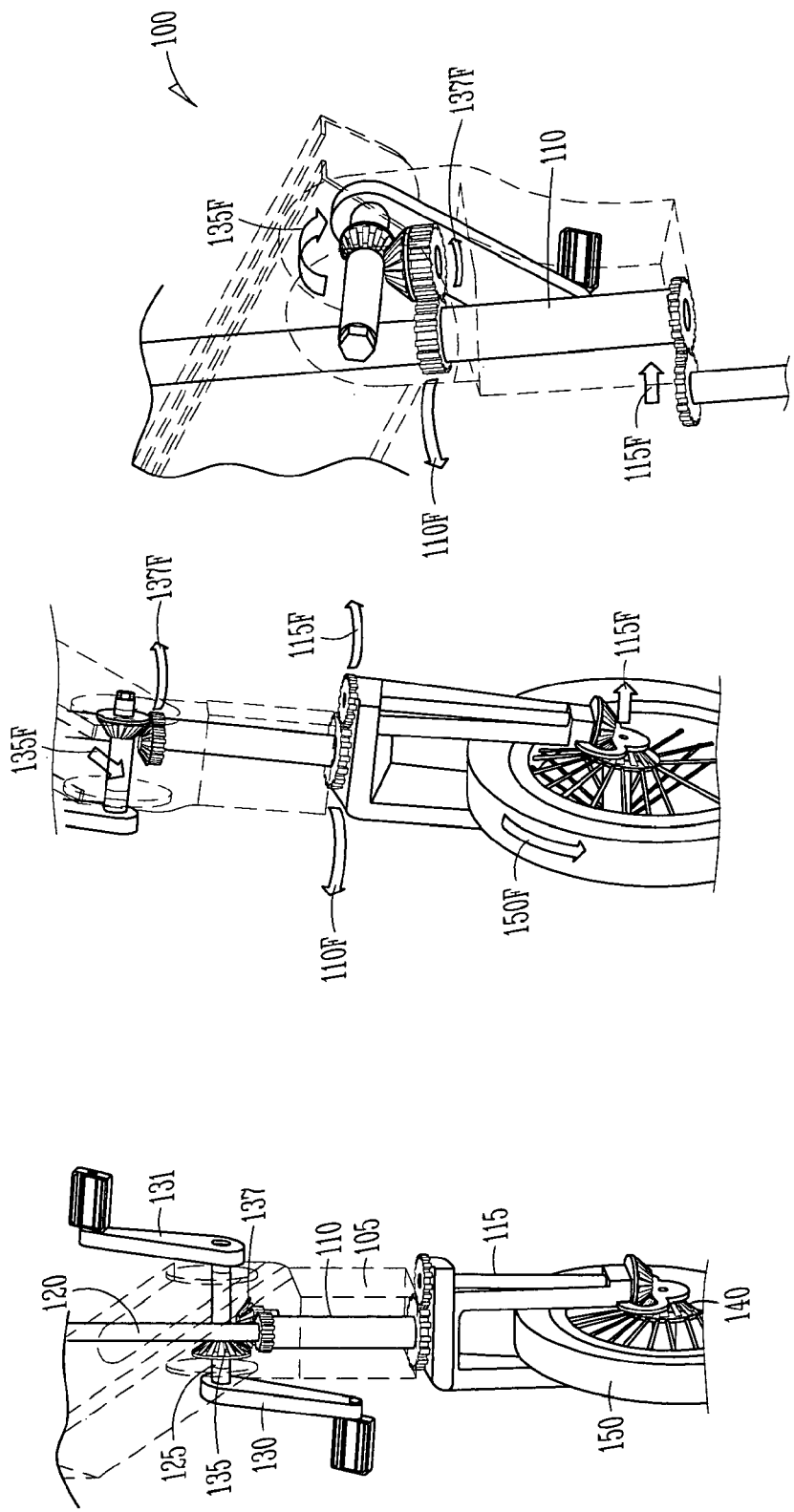
FIGS. 1A-1C illustrate a front-wheel drive, drive-and-steering unit, according to some embodiments.

The teachings provided herein are generally directed compact vehicle designs that can be used in a foldable, carry-on vehicle. The compact drive mechanisms presented herein, for example, have contributed to the advent of the compact, carry-on bicycles set-forth in the teachings.

In some embodiments, for example, the teachings are directed to a compact, combination drive-and-steering unit for a vehicle, the unit having a shared rotational space comprising a portion of a drive assembly and a portion of a steering assembly. The drive assembly can include a crankshaft having a crank axis that rotates in a fixed position relative to a chassis of a vehicle powered by the crankshaft. The crankshaft can be in an operable communication with a spool-shaft having a drive axis, the spool-shaft in an operable communication with a drive member. The drive member can be in an operable communication with a wheel assembly having a wheel, the drive assembly transferring a power from the crankshaft to drive the wheel. The steering assembly can include a strut in an operable communication with the wheel assembly, a steering axle in an operable communication with the strut, and a steering member in an operable communication with the steering axle. The steering axle can have a steering axis that is concentric to the drive axis of the spoolshaft in the shared rotational space, the spoolshaft circumscribing at least a portion of the steering axle. The steering axle can rotate freely, or substantially freely, within the spoolshaft, such that the crankshaft rotates in the fixed position independent, or substantially independent, of a rotation of the steering axle. The shared rotational space creates a compact, combination drive-and-steering unit for the vehicle.

The term "a shared rotational space" can refer to a defined area within the vehicles and units taught herein, in which at least two components rotate together, using the same or different axes of rotation. For example, a coaxial drive assembly can be contained in a shared rotational space. A coaxial drive assembly can include, for example, two, independent power transfer mechanism in one shared rotational space. In some embodiments, a first power transfer mechanism can be for steering the position, or rotational direction, of a first wheel, and a second power transfer mechanism can be for transferring a drive power from a drive power source to the first wheel as a drive wheel.

The term "a fixed position relative to a chassis of a vehicle" can refer to a position of rotation that, once fixed in position, does not change within the vehicles and units taught herein. In some embodiments, the fixed position can be adjustable to suit a body type of a user of the vehicle, for example. The term "substantially" is a descriptor that can refer to an extent to which any deficit, or difference, does not appreciably affect an intended function, action, or use. For example, the term a steering axle that rotates "substantially freely" within a spoolshaft can refer to a steering axle that may have some resistant to its rotation, although the resistance is not enough to appreciably affect the intended function, action, or use of the rotation of the steering axle. Likewise, a rotation of a crankshaft that is "substantially independent" of a rotation of a steering axle can refer to a crankshaft rotation that does not appreciably affect the intended function, action, or use of the rotation of the steering axle. In some embodiments, a movement can be substantially free, for example, when the work required to counter a mechanical resistance to the movement is less than about 1.0%, 2.0%, 3.0%, 5.0%, 7.0%, 10.0%, 12.0%, 15.0%, 17.0%, 20.0%, 25.0%, or 30.0% of the work of required without the resistance.

It should be appreciated that the drive member, in the embodiments set-forth herein, can be any operable connection that transfers power to the wheel. In some embodiments, the drive member comprises a linkshaft. In some embodiments, the drive member comprises a chain. And, in some embodiments, the drive member comprises a belt. One of skill will appreciate that a drive member, such as a linkshaft, can also be a telescoping linkshaft to enable additional room for collapse of the vehicle. For example, a vehicle having a collapsible linkshaft that traverses the C-channel can be telescoping, such that it can collapse with a concurrent collapse of a telescoping C-channel. Likewise, a vehicle having a collapsible linkshaft that traverses as strut can be telescoping, such that it can collapse with a concurrent collapse of a telescoping strut.

It should also be appreciated that the steering member, in the embodiments set-forth herein, can be any means for directing a steering of the vehicle. In some embodiments, the steering member is a handlebar. And, in some embodiments, the steering member is a steering wheel. Moreover, the steering member may comprise a single handle for additional space savings, which may be known to those in the art, in some embodiments, as "tiller steering", for example. Moreover, the steering member can be collapsible, in order further reduce the volume of the vehicle in it's collapsed state. For example, a handlebar can have foldable hingepoints that can be releasably lockable using any means known to one of skill. Such means can include, for example, a hinge-and-collar arrangement at the hingepoints, such that the hinge can be locked in place with the collar. The collar can be mobile or stationary, where an example of a mobile collar can be one that is translational along the longitudinal axis and locks in place around the hingepoint, for example, using a "twist-and-lock" type of design known to those of skill. An example of a stationary collar can be one that is fixed in place, such that it is not longitudinally translational, and longitudinal portion of the stem or handlebar can be longitudinally translated in and out of the fixed collar, which can also be a twist-and-lock device. As stated, any such mechanism known to one of skill may be suitable to the teachings herein.

It should be appreciated that the vehicle, in the embodiments set-forth herein, can be any vehicle that can benefit from the teachings provided herein. In some embodiments, the vehicle will have at least two wheels, three wheels, 4 wheels, or more. In some embodiments, the vehicle can transform from a two-wheeled vehicle to a three-wheeled vehicle, or even a four-wheeled vehicle, using variations of the same chassis and drive system. In some embodiments, the vehicle can include a drive-and-steering unit, a drive-and-chassis unit, or a combination thereof, such that both drive systems are used in one vehicle. In some embodiments, the vehicle is a bicycle. And, in some embodiments, the vehicle is a folding bicycle. In some embodiments, the vehicle can be a tandem bicycle, or even a folding, tandem bicycle. In some embodiments, the vehicle is a tricycle, a pedal truck, a pedal taxi, a pedal cart, a golf cart, a children's toy vehicle, a portabike, and the like.

The chassis of a vehicle will include a structural means to attach at least two wheels. As such, it should also be appreciated that a strut can be a structural member used to operably attach a wheel assembly to a vehicle chassis. One of skill will appreciate that a strut can include a fork. Moreover, in some embodiments, a strut can comprise a unifork.

FIGS. 1A-1C illustrate a front-wheel drive, drive-and-steering unit, according to some embodiments. FIG. 1A illustrates the drive-and-steering unit 100. A strut 105 encloses, or partially encloses, a spoolshaft 110, a linkshaft 115, and a steering axle 120. A crank 125 is powered by crankarms 130, 131 to turn a crank-bevel-gear 135, which turns an idler-bevel-gear 137, which turns a spool shaft 110, which turns a linkshaft 115, which turns a wheel-bevel-gear 140 to turn a wheel 150. FIG. 1B shows the rotational forces, where a crank-force 135$f$ produces an idler-force 137$f$, which produces a spoolshaft-force 110$f$, which produces a linkshaft-force 115$f$, which finally produces a wheel-force 150$f$. FIG. 1C is a closer view of forces in the drive-and-steering unit mechanism.

One of skill will appreciate that the mechanical structure of the drive units can include any type of gear arrangement known to one of skill. In some embodiments, the gear arrangement can include a bevel gear. One of skill will appreciate that a "bevel gear" can be any gear in a gear arrangement having a pair of gears with teeth surfaces cut so that they can connect unparallel gear shafts. In some embodiments, the bevel gear is cut at an angle of about 45°, to allow for gear shafts positioned normal to one another can connect to transfer a power to a wheel as described herein. One of skill will appreciate that any angle of cut can be used in order to accommodate any relate gear shaft position.

Figure 2B:
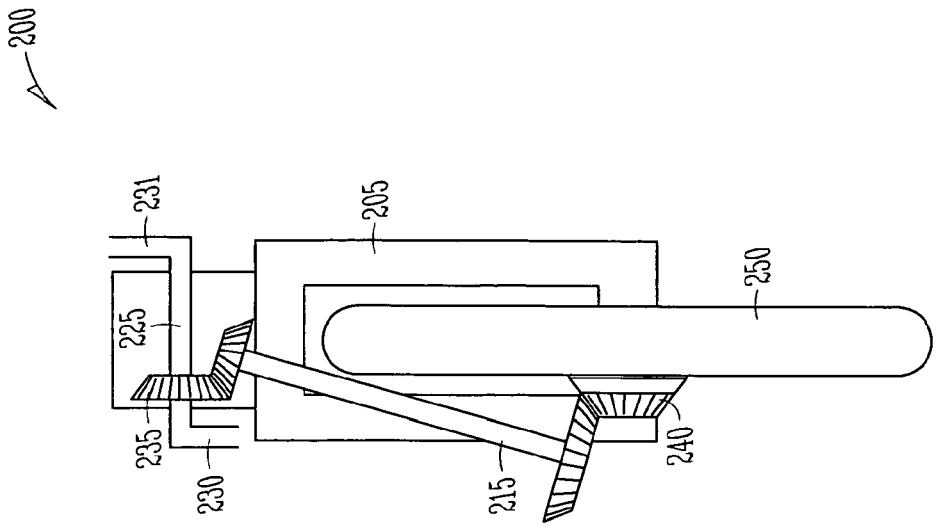
FIGS. 2A and 2B illustrate variations of the drive-and-steering unit mechanism, according to some embodiments.
Figure 2A:
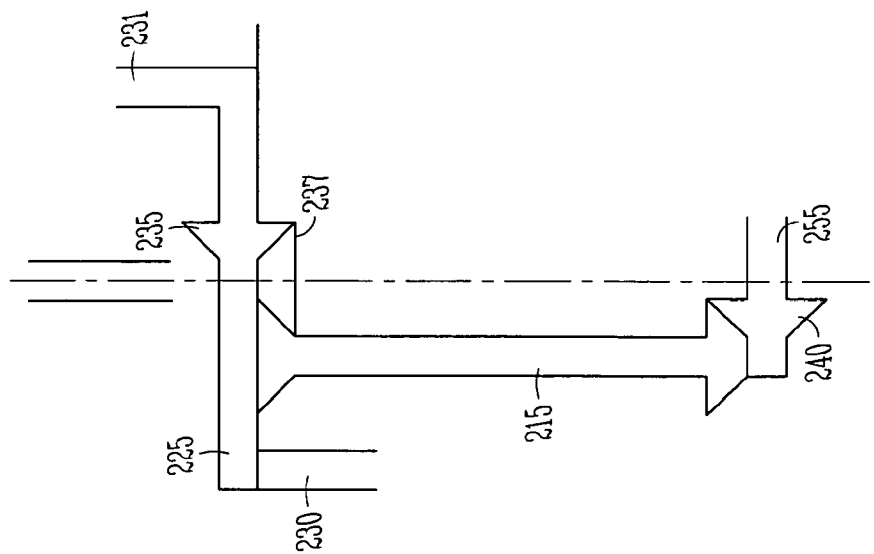

FIGS. 2A and 2B illustrate variations of the drive-and-steering unit mechanism, according to some embodiments. FIG. 2A shows the drive-and-steering unit 200 with the use of an idler-bevel-gear 237 to transfer power from the crankarms 230,231 to the crank 225 to the linkshaft 215, which transfers the power to the wheel-bevel-gear 240 to turn wheel axle 255. FIG. 2B illustrates a drive-and-steering unit that transfers power directly from the crank-bevel-gear 235 to the linkshaft 215 to transfer power to the wheel-bevel-gear 240 to turn the wheel 250, which is supported by the strut 205.

The drive-and-steering unit can be powered using any means known to one of skill. In some embodiments, any means of power that would function with the teachings herein can be used to power a drive wheel. In some embodiments, an electric motor can be used to power a drive wheel. And, in some embodiments, one or more electric motors can be used to power one or more drive wheels. For example, the drive-and-steering unit can further comprise an electric motor in an operable communication with the crankshaft. In another example, the drive-and-chassis unit can further comprise an electric motor in an operable communication with the crankshaft. In another example, one or more drive wheels can have one or more hubs that comprise an electric drive motor. The electric drive motor can have a source of power that is external to the chassis or internal to the chassis. A compact, carry-on vehicle, for example, can have batteries located in one or more struts, in some embodiments. And, one of skill will appreciate that batteries can also be conveniently located in removable cases, such as saddlebags or backpacks, from which the batteries can be conveniently re-charged in any location.

Figure 3:
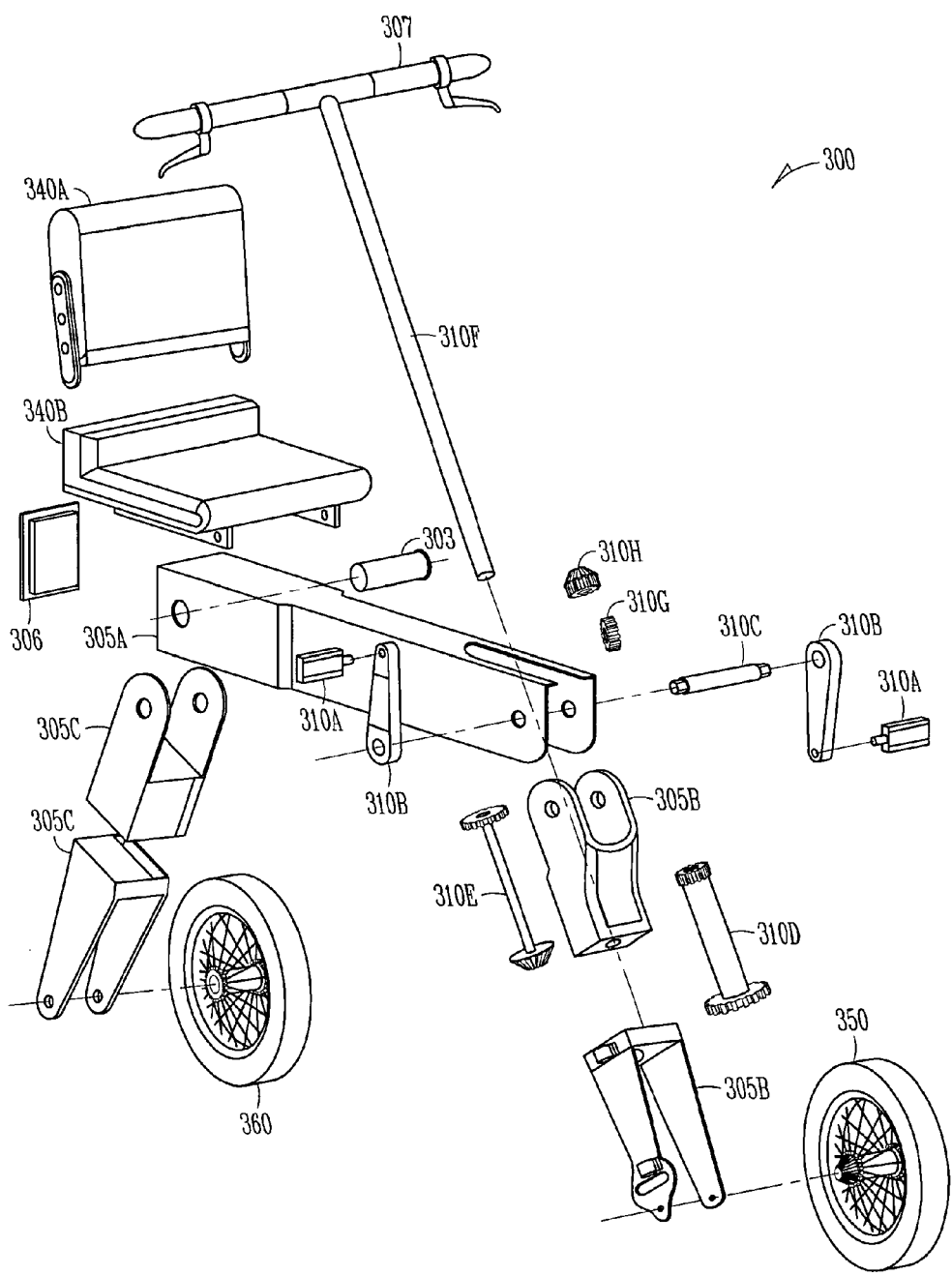
FIG. 3 illustrates a drive-and-steering unit in a bicycle, according to some embodiments.

FIG. 3 illustrates a drive-and-steering unit in a bicycle, according to some embodiments. Bicycle 300 has chassis 305 with C-channel 305A, front strut 305B, and rear strut 305C. A shared rotational space 310 has a portion of a drive assembly and a portion of a steering assembly. The drive assembly can include a pair of pedals 310A attached to a pair of crankarms 310B, the pair of crankarms 310B attached to a crankshaft 310C, the crankshaft 310C having a crank axis that rotates in a fixed position under a pedal power relative to the chassis 305. The crankshaft 310C can be in an operable communication with a spool-shaft 310D having a drive axis, the spoolshaft 310D in an operable communication with a drive member, and the drive member 310E in an operable communication with a wheel assembly 350 having a wheel. In these embodiments, the drive assembly transfers the pedal power from the crankshaft 310C to drive the wheel. The steering assembly can include a strut 305B in an operable communication with the wheel assembly 350, a steering axle 310F in an operable communication with the strut 305B, and a steering member 307 in an operable communication with the steering axle 310F. As such, the crankshaft 310C turns crankshaft-bevel-gear 310G, which turns idler-bevel-gear 310H, which turns spoolshaft 310D, which turns linkshaft 310E, which transfers power to the wheel assembly 350. The steering axle 310F can have a steering axis that is concentric to the drive axis of the spoolshaft 310D in the shared rotational space 310, the spoolshaft 310 circumscribing at least a portion of the steering axle 310F. The steering axle 310F can rotate freely, or substantially freely, within the spoolshaft 310, such that the crankshaft 310C rotates in the fixed position independent, or substantially independent, of a rotation of the steering axle 310F. And, the shared rotational space 310 can create a compact, combination drive-and-steering unit for the pedal-powered vehicle. FIG. 3 also shows a foldable seat 340 having a back 340A and a seat 340B that folds into itself, a rear pivot 303 for the rear strut 305C. An endcap 306 is used to close the rear portion of the C-channel 305A. And, the rear strut 305C is operably attached to a rear wheel assembly 360.

The compact drive-and-chassis mechanism can be designed include at least portion of the chassis. In some embodiments, for example, the teachings are directed to a compact, combination drive-and-chassis unit for a vehicle. The unit comprises a shared chassis space comprising at least a portion of a chassis assembly that encloses at least a substantial portion of a drive assembly. The drive assembly includes a crankshaft having a crank axis, the crankshaft in an operable communication with a drive member. The drive member can be in an operable communication with a wheel assembly having a wheel, the drive assembly transferring a power from the crankshaft to drive the wheel. The portion of the chassis assembly can function as a protective casing for the substantial portion of the drive assembly, the substantial portion of the drive assembly comprising the crankshaft and at least a substantial portion of the drive member. The drive member can have at least one fixably rotatable pivot point corresponding to a fixably rotatable joint in the chassis assembly for at least one re-direction of the power from the crankshaft to the wheel. And, the shared chassis space can create a compact, combination drive-and-chassis unit for the vehicle. The term "fixably rotatable" can refer to a pivot point that can rotate at least 2 degrees, 5 degrees, 10 degrees, 15 degrees, 30 degrees, 45 degrees, 90 degrees, 120 degrees, 135 degrees, 180 degrees, 225 degrees, 270 degrees, 360 degrees, or any range therein, while also lockable in a single position for normal use of the vehicle. The rotatable function can allow for an adjustment for preference of vehicle configuration or body type of the user during use of the vehicle, for example. In some embodiments, the rotatable function can be used to collapse the vehicle for storage or carrying by a user. Likewise the rotatable function can be used to expand, or open, the vehicle to an operational configuration for use by the user.

In some embodiments, a substantial portion of the chassis can be, for example, at least the C-channel. In some embodiments, a substantial portion of the chassis can be, for example, the C-channel and the rear strut. In some embodiments, a substantial portion of the chassis can be, for example, the C-channel and at least a substantial portion of the rear strut. In some embodiments, a substantial portion of the chassis can be, for example, the front strut. In some embodiments, a substantial portion of the chassis can be, for example, the front strut, the C-channel, and the rear strut. It should be appreciated that a "substantial portion" can be used to refer to the portion of the chassis desired to cover at least a portion of the mechanical drive components, such that the portion covered inhibits a contact between the user and the drive components, in accord with some purposes for the systems taught herein.

In some embodiments, a substantial portion of the drive components can be, for example, at least the portion positioned in the C-channel. In some embodiments, a substantial portion of the drive components can be, for example, the portion in the C-channel and the rear strut. In some embodiments, a substantial portion of the drive components can be, for example, the portion in C-channel and at least a substantial portion of the drive components in the rear strut. In some embodiments, a substantial portion of the drive components can be, for example, the portion located in the front strut. In some embodiments, a substantial portion of the drive components can be, for example, the portion in the front strut, the C-channel, and the rear strut. It should be appreciated that, for this aspect of the teachings, a "substantial portion" can be used to refer to the portion of the chassis or drive components that cover, or are covered, to inhibit a contact between the user and the drive components, in accord with some purposes for the systems taught herein.

In some embodiments, the vehicle can be collapsed for carrying or storage, or expanded into an operational configuration, without the use of tools. For example, the vehicle can be locked into a collapsed, carry-on configuration that includes releasably lockable fasteners, such as hooks, screws, bolts, magnets, and the like, wherein no tools are needed to release and/or lock the vehicle in a desired configuration, whether that configuration be the collapsed or operational configuration. It should be appreciated that such an assembly of components would facilitate a convenient release from, or collapse into, the carry-on configuration. As such, this ease of use also facilitates protection of the user from exposure to grease, dirt, grime, pinch or nip points, and the like. In some embodiments, the release of the vehicle from a collapsed state into an operational state can be performed with a single push of a button or pull of a trigger, for example, for ease of transformation and use. Likewise, the transformation of the bike from an operational state into a collapsed state can be performed through a single downward push motion of the bike into the collapsed state, during which the bike can be releasably locked into the collapsed, or carry-on, configuration.

In some embodiments, the vehicles provided herein can have elastomeric materials positioned, for example, at the point of contact between the strut and the C-channel to provide the user with shock absorption. The elastomeric material can be any elastomer known to one of skill as suitable for the mechanical and weight requirements of the systems taught herein. For example, the weight requirement at each elastomeric component can range from about 50 kg to about 1000 kg, from about 400 kg to about 800 kg, from about 30 kg to about 600 kg, from about 50 kg to about 500 kg, from about 50 kg to about 400 kg, from about 50 kg to about 300 kg, from about 50 kg to about 250 kg, from about 50 kg to about 125 kg, from about 50 kg to about 100 kg, or any range therein. One of skill will appreciate that an elastomer or shock absorbance mechanism can be place in a variety of positions on the vehicles taught herein. In some embodiments, a strut can be designed to include any shock absorbing design known to one of skill to be suitable for the vehicles taught herein.

The size of a vehicle in a collapsed configuration provides a user with ease of storage, carrying, transport, and the like. In some embodiments, for example, the size of the collapsed configuration is equal to or insignificantly greater than the size of the C-channel used in the assembly of the vehicle. In some embodiments, the size of the collapsed configuration is substantially greater than the size of the C-channel but generally limited to an additional protrusion of wheel diameter or steering member. In some embodiments, the size of the collapsed configuration has a size that is within the standards of many major airlines, for example, for carry-on luggage. As such, the size of the collapsed configuration can be designed to meet the standards of most public transportation system limitations. In some embodiments, the overall length of a collapsed vehicle can range from about 12" to about 24", about 12" to about 40", about 12" to about 36", about 12" to about 30", about 12" to about 32", about 12" to about 34", about 12" to about 38", about 14" to about 24", about 16" to about 24", about 18" to about 24", and the like. In some embodiments, the overall width of a collapsed vehicle can range from about 4" to about 8", about 4" to about 7", about 4" to about 6", about 4" to about 5", about 5" to about 8", about 5" to about 7", about 5" to about 6", about 6" to about 8", about 6" to about 7", about 7" to about 8", and the like. In some embodiments, the overall height of a collapsed vehicle can range from about 6" to about 12", about 6" to about 20", about 6" to about 18", about 6" to about 15", about 6" to about 16", about 6" to about 17", about 6" to about 19", about 7" to about 12", about 8" to about 12", about 9" to about 12", and the like.

The chassis can further comprise a rear strut having a proximal end and a distal end, the proximal end attaching to the remainder of the chassis at a rotatably-lockable rear strut pivot at the fixably rotatable joint, and the distal end operably attaching to the wheel assembly.

As with the combined drive-and-steering unit above, it should be appreciated that the drive member, in the embodiments set-forth herein, can be any operable connection that transfers power to the wheel. In some embodiments, the drive member comprises a linkshaft. In some embodiments, the drive member comprises a chain. And, in some embodiments, the drive member comprises a belt. Likewise, as with the combined drive-and-steering unit above, it should be appreciated that the steering member, in the embodiments set-forth herein, can be any means for directing a steering of the vehicle. In some embodiments, the steering member is a handlebar. Likewise, as with the combined drive-and-steering unit above, the vehicle can be any vehicle that can benefit from the combination drive-and-chassis unit. In some embodiments, the vehicle is a bicycle. And, in some embodiments, the vehicle is a folding bicycle. Moreover, as with the combined drive-and-steering unit above, it should be appreciated that a strut can be a structural member that is used to operably attach a wheel assembly to a vehicle chassis. Again, one of skill will appreciate that a strut can include a fork and, in some embodiments, a strut can comprise a unifork.

As with the drive-and-steering unit, the drive-and-chassis unit can be powered using any means known to one of skill. For example, the drive-and-chassis unit can further comprise an electric motor in an operable communication with the crankshaft. Likewise, the teachings are also directed to a compact, combination drive-and-chassis unit for a pedal-powered vehicle. In these embodiments, the drive-and-chassis unit can comprise a shared chassis space comprising at least a portion of a chassis assembly that encloses at least a substantial portion of a drive assembly. The drive assembly can include a pair of pedals attached to a pair of crankarms, the pair of crankarms attached to a crankshaft. The crankshaft can have a crank axis and be in an operable communication with a drive member, the drive member in an operable communication with a wheel assembly having a wheel. And, the drive assembly can transfer a pedal power from the crankshaft to drive the wheel. In these embodiments, the portion of the chassis assembly can function as a protective casing for the substantial portion of the drive assembly, the substantial portion of the drive assembly comprising the crankshaft and at least a substantial portion of the drive member. The drive member can have at least one fixably rotatable pivot point corresponding to a fixably rotatable joint in the chassis assembly for at least one re-direction of the power from the crankshaft to the wheel. And, the shared chassis space can create a compact, combination drive-and-chassis unit for the vehicle.

The power can be transferred from the crank to the wheel through a chain set. As such, in some embodiments, the teachings are directed to a compact, combination drive-and-chassis unit for a pedal-powered vehicle that includes a chain set.

Figure 4A:
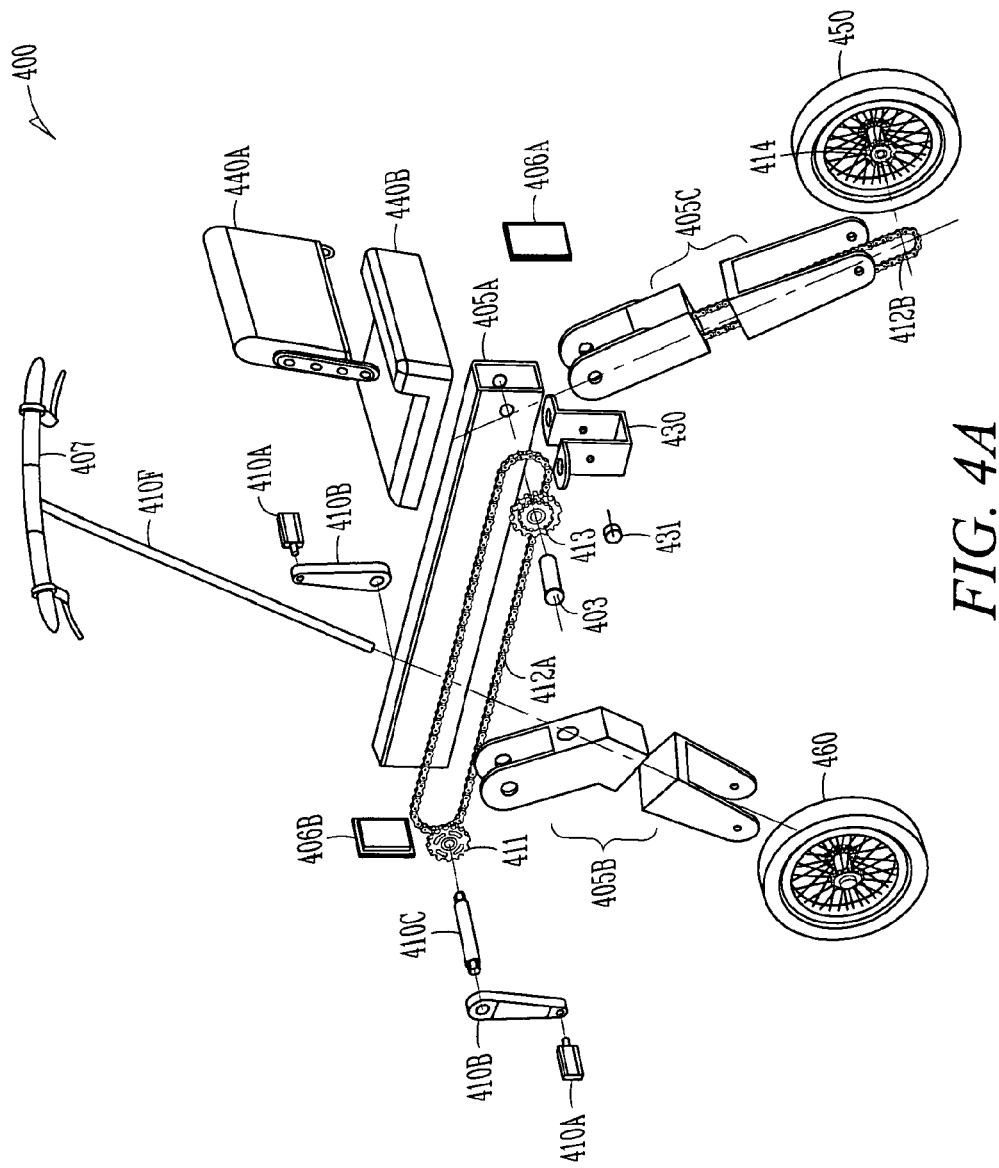
FIGS. 4A-4C illustrate a bicycle having a shared chassis as a drive-and-chassis unit, according to some embodiments.
Figure 4B:
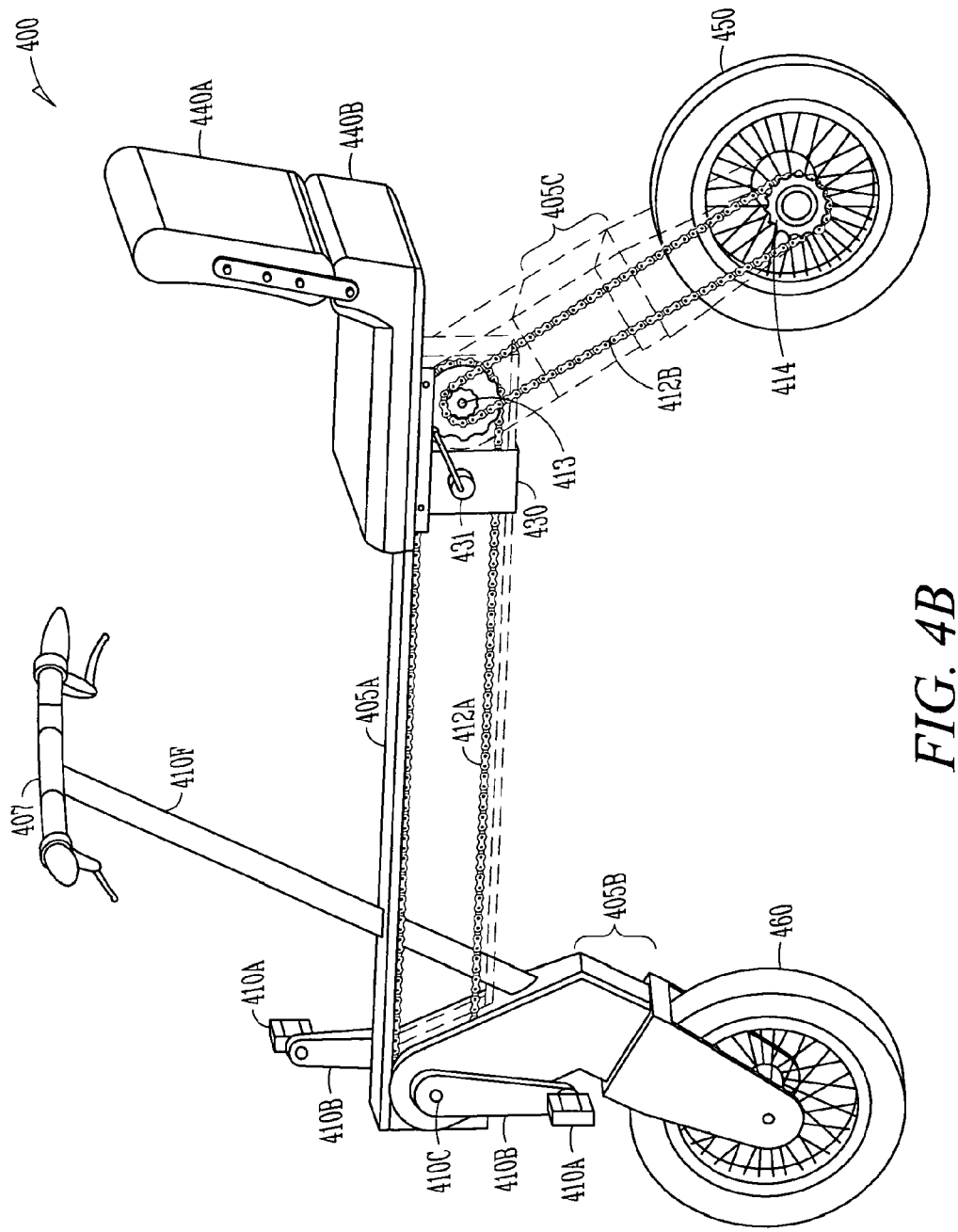
Figure 4C:
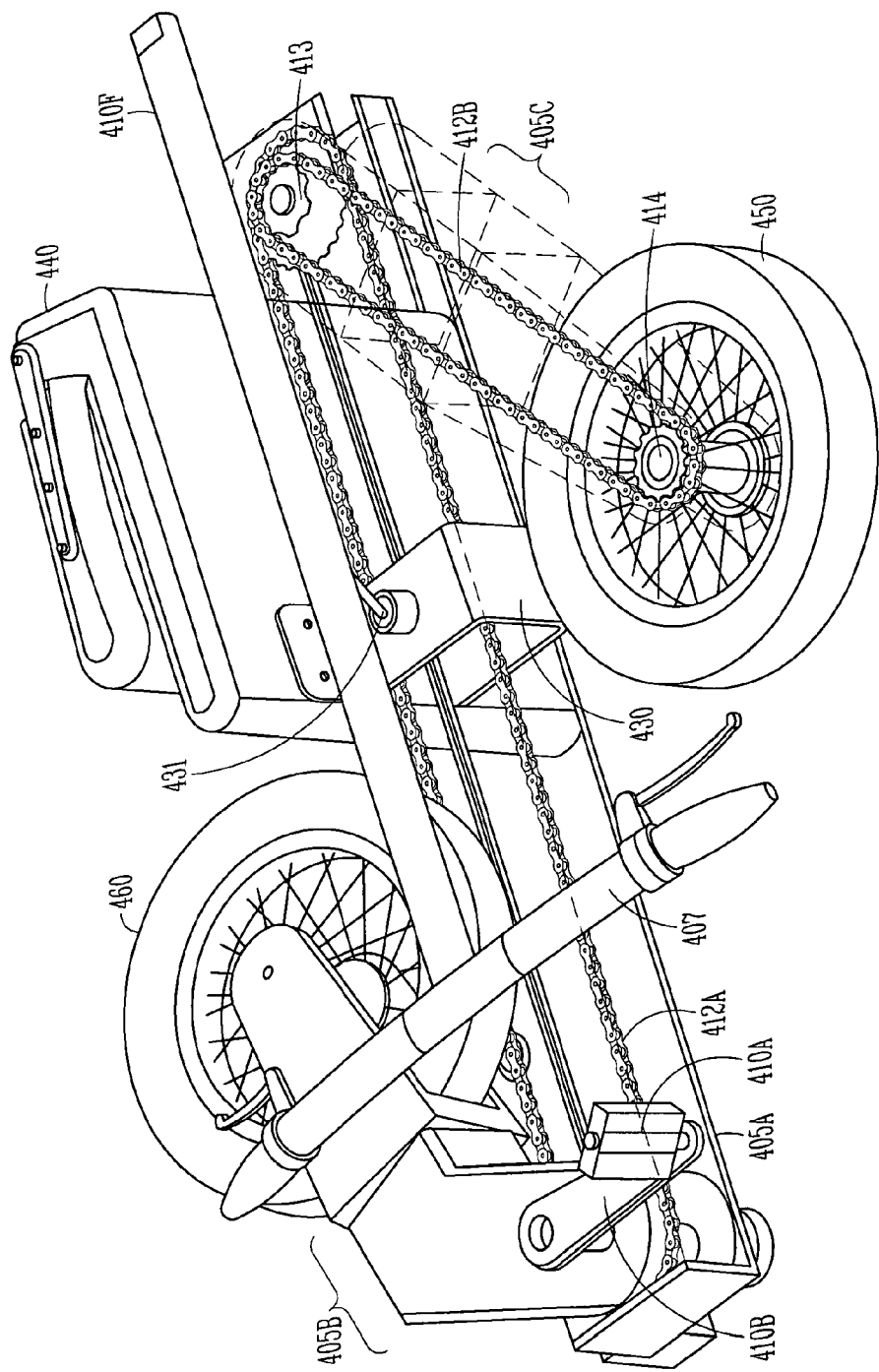

FIGS. 4A-4C illustrate a bicycle having a shared chassis as a drive-and-chassis unit, according to some embodiments. The bicycle 400 has a shared chassis space 410 that comprises at least a portion of a chassis assembly that encloses at least a substantial portion of a drive assembly. The chassis includes C-channel 405A, front strut 405B and rear strut 405C The drive assembly can include a pair of pedals 410A attached to a pair of crankarms 410B, the pair of crankarms 410B attached to a crankshaft 410C. The crankshaft 410C can have a crank axis and a first sprocket 411. The crankshaft 410C can be in an operable communication with a chain set having a roller chain 412A,412B and a second sprocket 413 having a second sprocket axis, the chain set in an operable communication with a rear wheel assembly 450 having a wheel, and a third sprocket 414. And, the drive assembly can transfer a pedal power from the crankshaft 410C to drive the rear wheel assembly 450. FIG. 4A also shows front wheel assembly 460 a steering axle 410F and handlebars 407, as well as seat back 440A, seat bottom 440B, and seat adjuster 430,431. FIG. 4B shows a cut-away perspective of the drive-and-chassis unit to better illustrate the pivot detail where the rear strut 405C attaches to the C-channel 405A. FIG. 4C illustrates how the fixably rotatable struts, collapsible seat 440, and removable handlebar 407 and steering axle 410F can create a collapsed bicycle 400 for storage or transport.

In some embodiments, the portion of the chassis assembly can function as a protective casing for the substantial portion of the drive assembly, the substantial portion of the drive assembly comprising the crankshaft and at least a substantial portion of the drive member. The chain set can have a fixably rotatable pivot point at the second sprocket axis corresponding to a fixably rotatable joint in the chassis assembly for a re-direction of the pedal power from the crankshaft to the second sprocket, and from the second sprocket to the wheel. And, the shared chassis space can create a compact, combination drive-and-chassis unit for the vehicle.

The teachings are also directed to any of a variety of bicycles having the features discussed above. In some embodiments, the teachings are directed to a folding bicycle with an enclosed, front-wheel shaft-drive.

Figure 5A:
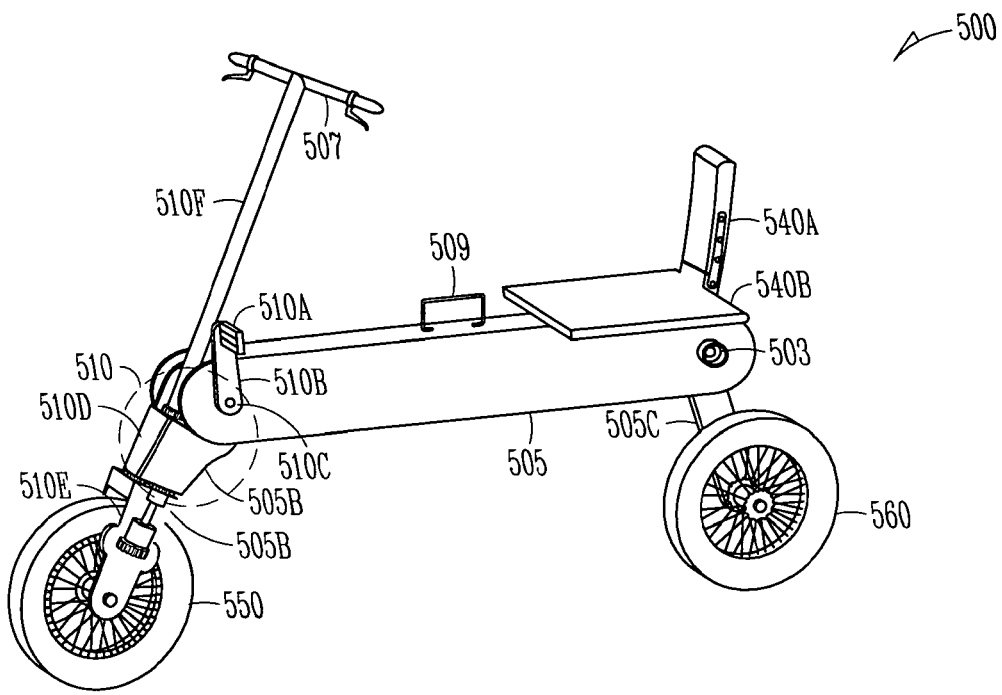
FIGS. 5A and 5B illustrate a short-strut, front-wheel drive bicycle having a shared rotational space, according to some embodiments.
Figure 5B:
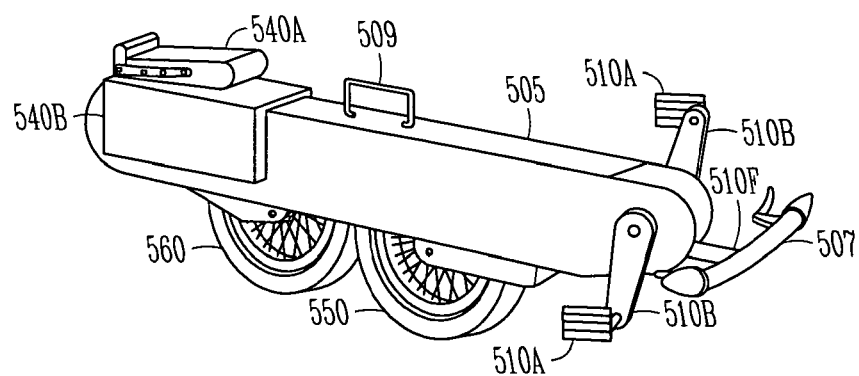

FIGS. 5A and 5B illustrate a short-strut, front-wheel drive bicycle having a shared rotational space, according to some embodiments. FIG. 5A shows a bicycle 500 having the shared rotational space 510 including (i) a portion of a drive assembly and (ii) a portion of a steering assembly, as well as a folding chassis 505 with a handle 509 for carrying the bicycle 500 in a collapsed configuration. The folding chassis 505 includes (iii) a rotatably-lockable front strut 505B supporting a front wheel assembly 550 having a front wheel, and (iv) a rotatably-lockable rear strut 505C supporting a rear wheel assembly 560 having a rear wheel. The drive assembly can include a pair of pedals 510A attached to a pair of crankarms 510B, the pair of crankarms 510B attached to a crankshaft 510C. The crankshaft 510C can have a crank axis that rotates under a pedal power in a fixed position in the chassis, the crankshaft 510C in an operable communication with a spoolshaft 510D having a drive axis. The spool-shaft 510E can be in an operable communication with a drive member 510E, and the drive member 510E can be in an operable communication with the front wheel assembly 550. The drive assembly can transfer the pedal power from the crankshaft 510C to drive the front wheel. The steering assembly can include the front strut 505B in an operable communication with the front wheel assembly 550, a steering axle 510F in an operable communication with the front strut 505B, and a steering member 507 in an operable communication with the steering axle 510F. The steering axle 510F can have a steering axis that is concentric to the drive axis of the spoolshaft 510D in the shared rotational space, the spoolshaft 510D circumscribing at least a portion of the steering axle 510F. The steering axle 510F can rotate freely, or substantially freely, within the spoolshaft 510D, such that the crankshaft 510C rotates in the fixed position independent, or substantially independent, of a rotation of the steering axle 510F. The front strut 505B can have a proximal end and a distal end, the proximal end of the front strut 505B attaching to the chassis 505 at a rotatably-lockable front strut pivot 510C. The rear strut 505C can have a proximal end and a distal end, the proximal end of the rear strut 505C attaching to the chassis 505 at a rotatably-lockable rear strut pivot 503. And, the shared rotational space can create a compact, combination drive-and-steering unit for the pedal-powered vehicle. FIG. 5B illustrates the bicycle 500 in a collapsed configuration for storage or transport, in which the steering axle and handlebars retract into the C-channel 505, the front strut 505B and rear strut 505C rotate into the C-channel 505, and the foldable seat 540A,540B collapses for a more compact, carry-on bicycle.

In some embodiments, the front strut can be releasably-lockable in a plurality of positions. And, in some embodiments, the rear strut can be releasably-lockable in a plurality of positions to vary wheel-base or vehicle seat height, for example. Examples of locking positions can include, for example 5 degree, 10 degree, 15 degree, 20 degree, 25 degree, 30 degree, 35 degree, 40 degree, 45 degree, 50 degree, 55 degree, 60 degree, 65 degree, 70 degree, 75 degree, 80 degree, 85 degree, and 90 degree positions, or any position in-between in 1 degree increments. In some embodiments, the front strut is a unifork, the rear strut is a unifork that is complementary in shape to the front strut, such that the front strut, the front wheel assembly, the rear strut, and the rear wheel assembly can collapse into the chassis in a complementary configuration to form a compact, carry-on bicycle.

Figure 6A:
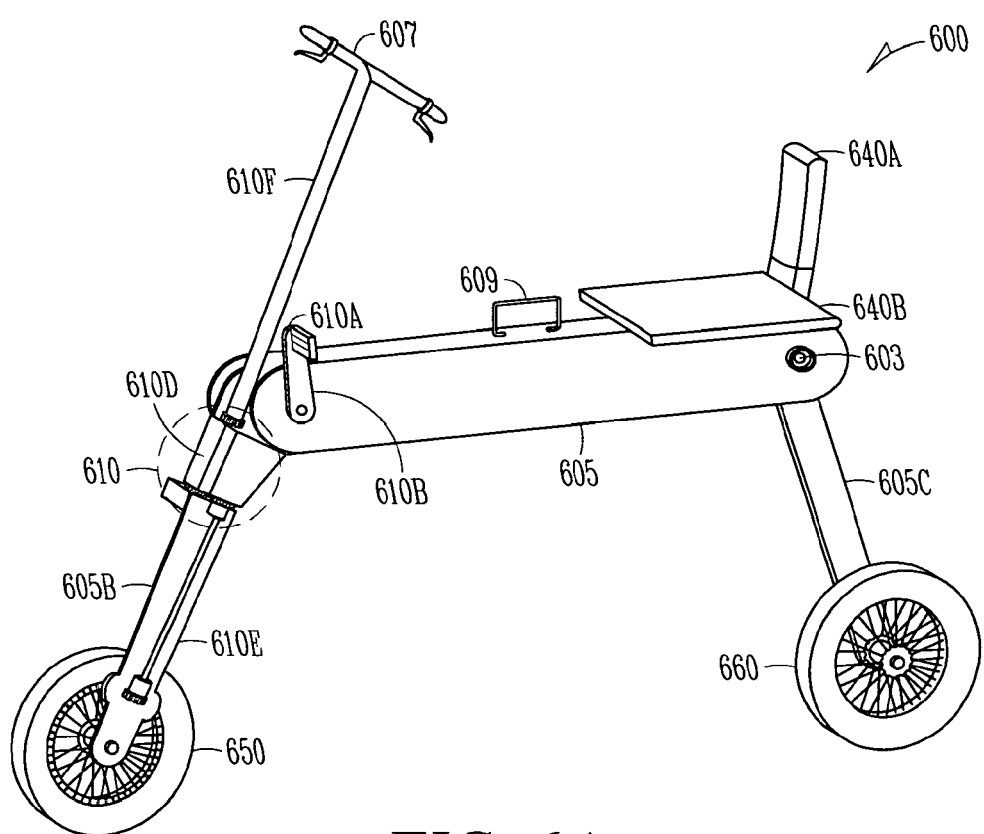
FIGS. 6A-6D illustrate a long-strut, unifork-type, front-wheel drive bicycle having a shared rotational space, according to some embodiments.

FIGS. 6A-6D illustrate a long-strut, unifork-type, front-wheel drive bicycle having a shared rotational space, according to some embodiments. FIG. 6A shows a bicycle 600 having the shared rotational space 610 including (i) a portion of a drive assembly and (ii) a portion of a steering assembly, as well as a folding chassis 605 with a handle 609 for carrying the bicycle 600 in a collapsed configuration. The folding chassis 605 includes (iii) a rotatably-lockable front strut 605B supporting a front wheel assembly 650 having a front wheel, and (iv) a rotatably-lockable rear strut 605C supporting a rear wheel assembly 660 having a rear wheel. The drive assembly can include a pair of pedals 610A attached to a pair of crankarms 610B, the pair of crankarms 610B attached to a crankshaft 610C. The crankshaft 610C can have a crank axis that rotates under a pedal power in a fixed position in the chassis, the crankshaft 610C in an operable communication with a spoolshaft 610D having a drive axis. The spool-shaft 610E can be in an operable communication with a drive member 610E, and the drive member 610E can be in an operable communication with the front wheel assembly 650. The drive assembly can transfer the pedal power from the crankshaft 610C to drive the front wheel. The steering assembly can include the front strut 605B in an operable communication with the front wheel assembly 650, a steering axle 610F in an operable communication with the front strut 605B, and a steering member 607 in an operable communication with the steering axle 610F. The steering axle 610F can have a steering axis that is concentric to the drive axis of the spoolshaft 610D in the shared rotational space, the spoolshaft 610D circumscribing at least a portion of the steering axle 610F. The steering axle 610F can rotate freely, or substantially freely, within the spoolshaft 610D, such that the crankshaft 610C rotates in the fixed position independent, or substantially independent, of a rotation of the steering axle 610F.

Figure 6B:
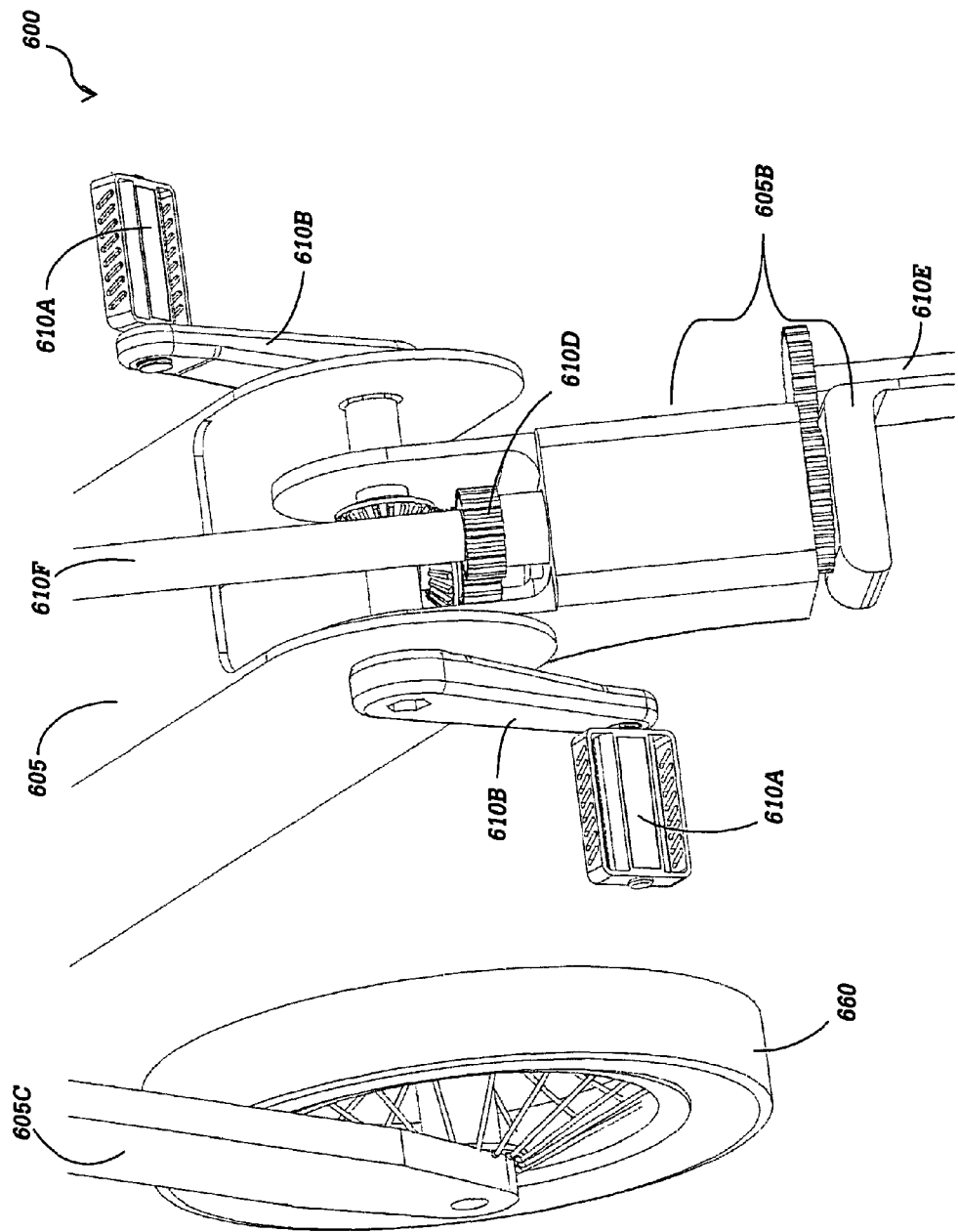
Figure 6C:
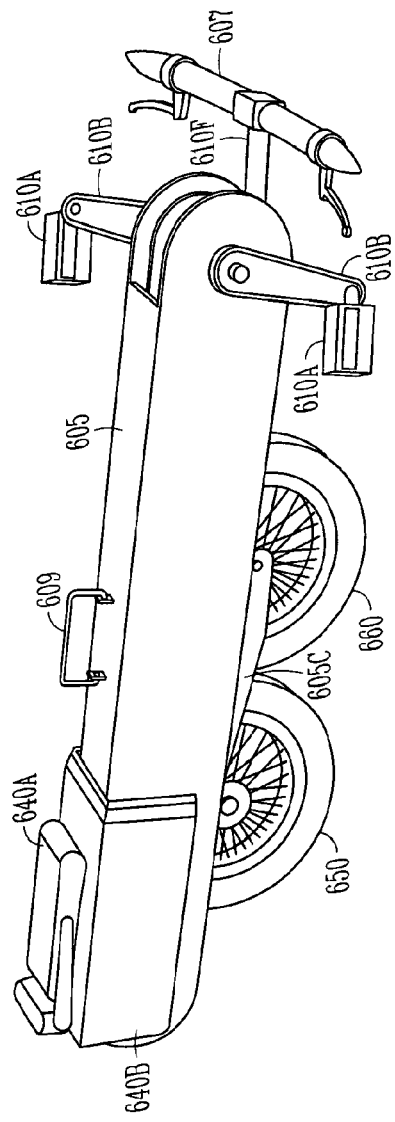
Figure 6D:
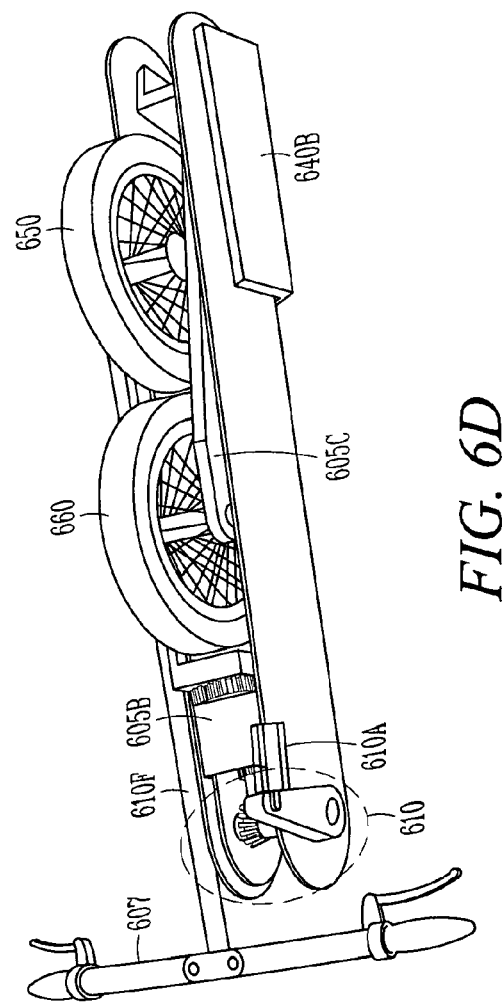

The front strut 605B can have a proximal end and a distal end, the proximal end of the front strut 605B attaching to the chassis 605 at a rotatably-lockable front strut pivot 610C. The rear strut 605C can have a proximal end and a distal end, the proximal end of the rear strut 605C attaching to the chassis 605 at a rotatably-lockable rear strut pivot 603. And, the shared rotational space can create a compact, combination drive-and-steering unit for the pedal-powered vehicle. FIG. 6B provides a closer view of the drive-and-steering unit. FIGS. 6C and 6D illustrate the bicycle 600 in a collapsed configuration for storage or transport, in which the steering axle and handlebars retract into the C-channel 605. In addition, the front strut 605B, which is a front unifork, and rear strut 605C, which is a rear unifork are at least substantially complementary to each other in a collapsed configuration. As such, the front unifork and the rear unifork can rotate into the C-channel 605 in a complementary and overlapping configuration. Moreover, the foldable seat 640A,640B can be designed to collapse onto the C-channel for a more compact, carry-on bicycle. It should be appreciated that the overlapping and complementary configurations of the struts allow for a highly-compact, collapsed vehicle system. The term "substantially complementary" can be used to refer to components that, in a collapsed state or operational state, can be placed in a positional relationship that facilitates a compact vehicle composing a volume that is reduced relative to such a vehicle that has like components that are not substantially complementary. In some embodiments the reduction in volume can be, for example, at least 10%, at least 20%, at least 25%, at least 30%, at least 35%, at least 40%, at least 45%, at least 50%, at least 55%, at least 60%, at least 65%, at least 70% and, in some embodiments, at least 75%.

In some embodiments, the chassis functions as a protective casing for the crankshaft, the spool-shaft, and the drive member during an operation of the bicycle. And, in some embodiments, the chassis functions as a protective casing for the crankshaft, the spool-shaft, the drive member, the front strut, the front wheel assembly, the rear strut, and the rear wheel assembly during a collapse of the bicycle.

In some embodiments, the steering member can be a collapsibly lockable handlebar. And, in some embodiments, the bicycle can further comprise a collapsibly lockable seat. Moreover, in some embodiments, the bicycle can weigh less than about 10 pounds. In some embodiments, the bicycle can weigh less than about 30 pounds, less than about 28 pounds, less than about 26 pounds, less than about 24 pounds, less than about 22 pounds, less than about 20 pounds, less than about 18 pounds, less than about 16 pounds, less than about 14 pounds, less than about 12 pounds, less than about 10 pounds, less than about 8 pounds, or any weight therein in increments of about 1 pound.

Likewise, a bicycle can have the drive-and-chassis unit. As such, the teachings are also directed to a compact, carry-on bicycle with an enclosed, drive assembly.

Figure 7A:
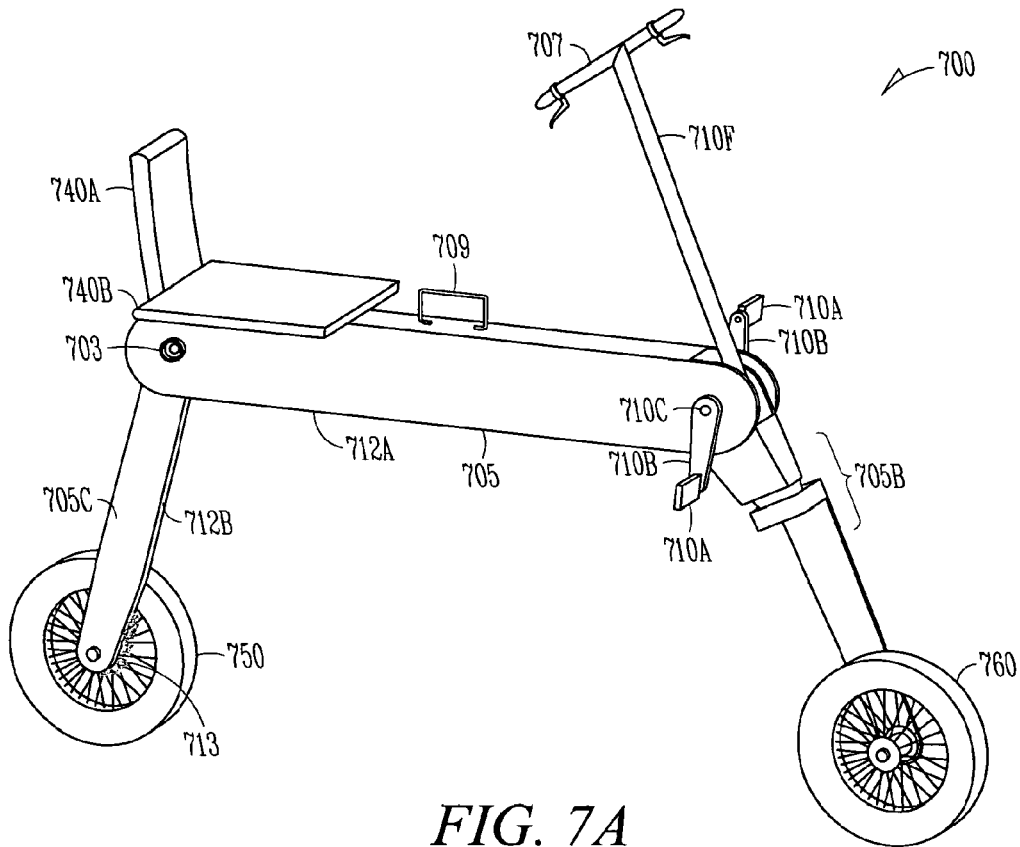
FIGS. 7A-7D illustrate a bicycle having a shared drive-and-chassis unit, according to some embodiments.
Figure 7B:
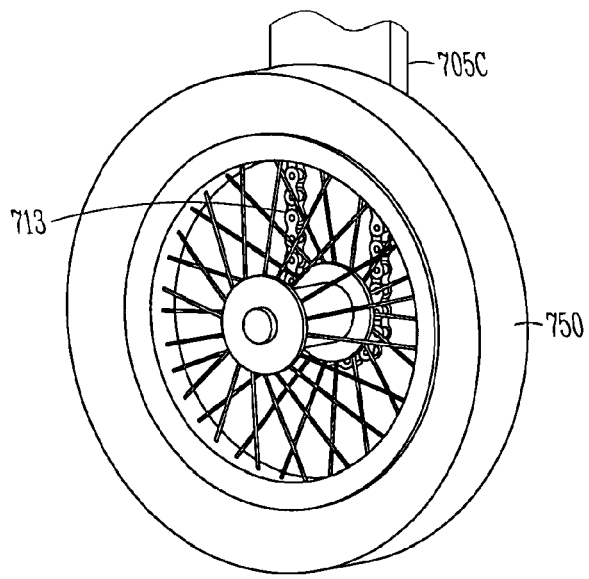

FIGS. 7A-7D illustrate a bicycle having a shared drive-and-chassis unit, according to some embodiments. FIG. 7A shows bicycle 700 comprising (i) at least a portion of a chassis assembly that encloses (ii) at least a substantial portion of a drive assembly, as well as a folding chassis 705 including (iii) a rotatably-lockable front strut 705B supporting a front wheel assembly 760 having a front wheel, and (iv) a rotatably-lockable rear strut 705C supporting a rear wheel assembly 750 having a rear wheel. The drive assembly can include a pair of pedals 710A attached to a pair of crankarms 7106, the pair of crankarms 7106 attached to a crankshaft 710C. The crankshaft 710C can have a crank axis that rotates under a pedal power in a fixed position in the chassis 705, the crankshaft 710C in an operable communication with a drive member 712A (not shown), and the drive member 712A can be in an operable communication with the rear wheel assembly 750, the drive assembly transferring the pedal power from the crankshaft 710C to drive the rear wheel. The portion of the chassis assembly 705 can function as a protective casing for the substantial portion of the drive assembly, the substantial portion of the drive assembly comprising the crankshaft 710C and at least a substantial portion of the drive member 712A. The drive member 712A can have a fixably rotatable pivot point corresponding to a fixably rotatable joint in the chassis assembly for a re-direction of the pedal power from the crankshaft to the pivot point and from the pivot point to the wheel through drive member 7126 (not shown). The front strut 705B can have a proximal end and a distal end, the proximal end of the front strut 705B attaching to the chassis 705 at a rotatably-lockable front strut pivot 710C. The rear 705C strut can have a proximal end and a distal end, the proximal end of the rear strut 705C attaching to the chassis 705 at a rotatably-lockable rear strut pivot 703. And, the shared chassis space can create a compact, combination drive-and-steering unit for the pedal-powered vehicle.

Figure 7C:
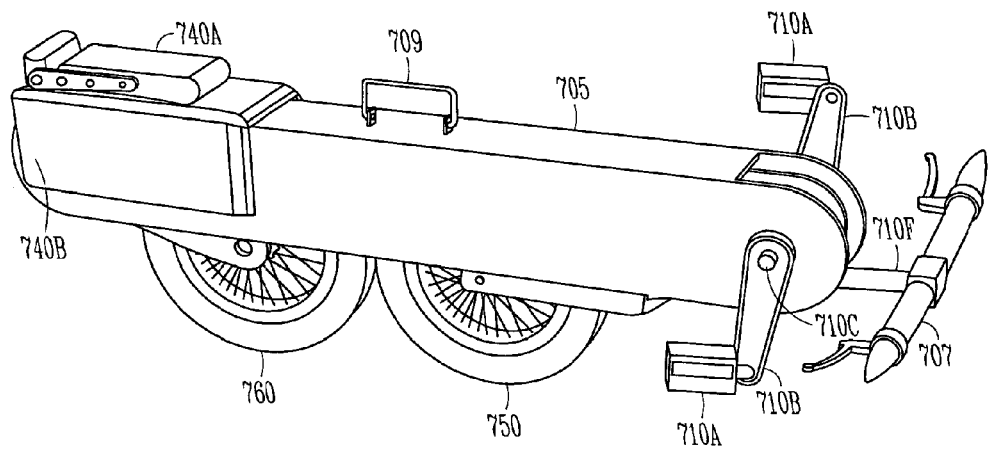
Figure 7D:
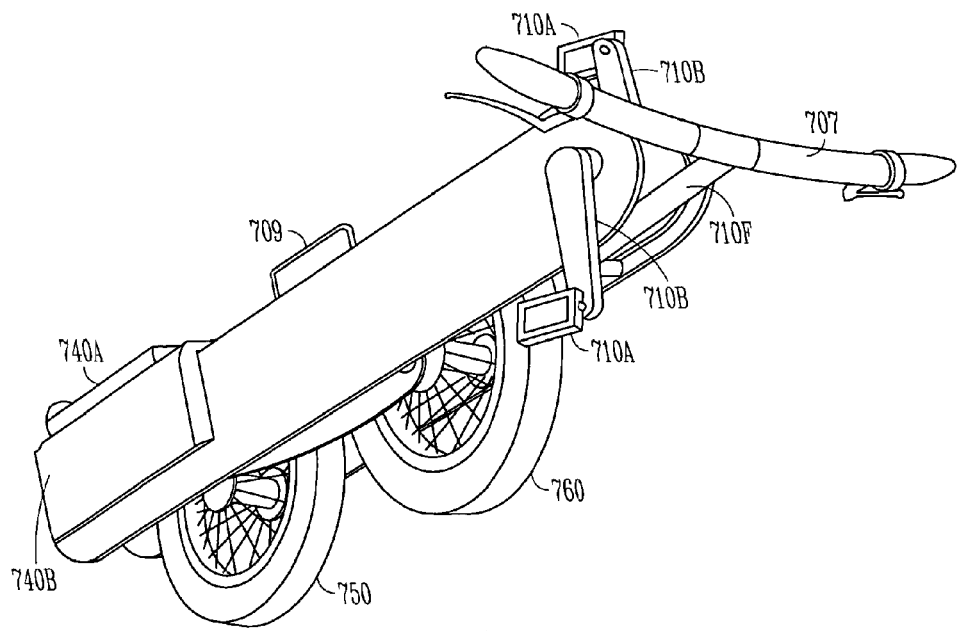

In some embodiments, the front strut can be releasably-lockable in a plurality of positions. Likewise, in some embodiments, the rear strut can be releasably-lockable in a plurality of positions. The result of the releasably-lockable struts is an adjustable and selectable variability in wheel base and/or height of the bicycle to adjust for wheel base, chassis height/seat height, as well as to allow for a collapse of the bicycle into a compact, carry-on vehicle. FIGS. 7C and 7D illustrate bicycle 700 in a collapsed, compact, carry-on configuration.

As with the bicycle having the combination drive-and-steering unit, the front strut can be a unifork, and the rear strut can be a unifork that is complementary in shape to the front strut, such that the front strut, the front wheel assembly, the rear strut, and the rear wheel assembly collapse into the chassis in a complementary configuration to form a compact, carry-on bicycle. Likewise, the chassis can function as a protective casing for the crankshaft, the drive member, the front strut, the front wheel assembly, the rear strut, and the rear wheel assembly during a collapse of the bicycle Example 1

In some embodiments, a vehicle can be manufactured from roughly a 36"×36" piece of sheet steel or aluminum. It should be appreciated that alternate chassis materials can include plastic, fiberglass, carbon fiber, or other metal alloys, resins, or combinations thereof.

The vehicle can be a bicycle, for example. Depending on the height of the C-channel sides, the sheet is marked, cut and bent into an inverted C-channel with roughly a 6" wide back and 6" to 12" high sides to the C-channel. The top of the channel can be bent to include a lip on each outer side of the channel to accommodate a sliding seat that is lockable in position for varying rider sizes. Holes are stamped or drilled into the C-channel to accommodate axles and pivot points, as well as any other points of attachment. The axles for mounting the struts, for example, are attached to the C-channel. The wheels are positioned in tandem using uni-struts, as opposed to forks, to allow for a complementary positioning of the front and rear struts during a collapse of the bicycle for storage or transport. A telescoping steering axle and handlebar set can be used to assist in a tight and compact collapse of the bicycle components into the C-channel. It should also be appreciated that the transverse cross-section of the "C-channel" can be square in cross-section, rectangular in cross-section, generally round in cross-section, or generally elliptical in cross section, for the function or aesthetics. And, the longitudinal shape can also vary, such that the height of the C-channel can be taller in the center than on an end, for example. In some embodiments, the function of the C-channel is to serve as a container for at least the struts and wheel assemblies, in a manner similar to the housing of a jack-knife serving as a container for at least the knife blades of the jack-knife. Likewise, the housing of the C-channel and the jack-knife are comparable in that both serve as functional and mechanical members during operation of the device in addition to serving as a container to protect the user from hazards that would otherwise be inherent to a similar device that remains uncontained when not in operation.

It should be appreciated that a variety of components can be selected to build the bicycle. For example, wheels can range in size from a diameter ranging from about 3" to a diameter of about 24", from about 4" to a diameter of about 22", from about 5" to a diameter of about 21", from about 6" to a diameter of about 20", from about 7" to a diameter of about 19", from about 8" to a diameter of about 18", from about 10" to a diameter of about 16", from about 12" to a diameter of about 14", from about 12" to a diameter of about 16", from about 12" to a diameter of about 18", or any range therein. In some embodiments, the C-channel can be about 34"×5.5"×14". In some embodiments, the length of the C-channel can range from about 20" to about 40", from about 24" to about 40", from about 18" to about 36", from about 18" to about 32", from about 32" to about 40", from about 32" to about 38", from about 34" to about 40", from about 32", about 33", about 34", about 35", about 36", about 37", about 38", about 39", about 40" or any length therein. In some embodiments, the width of the C-channel can range from about 3" to about 6", from about 4" to about 6" from about 3" to about 5", about 3", 4", 5", 6", or any width therein. In some embodiments the height of the C-channel can range from about 4" to about 14", from about 4" to about 12", from about 5" to about 14", about 4", 5", 6", 7", 8", 9", 10", 11", 12", 13", 14", or any height therein.

It should also be appreciated that any manufacturing process known to one of skill can be used to manufacture the components taught herein, including forging, casting, extruding, and the like. And, any material considered suitable by one of skill in the teachings herein can be used, as well as any fastening, welding, or bonding process that one of skill would considered suitable for the teachings provided herein.

Figure 8B:
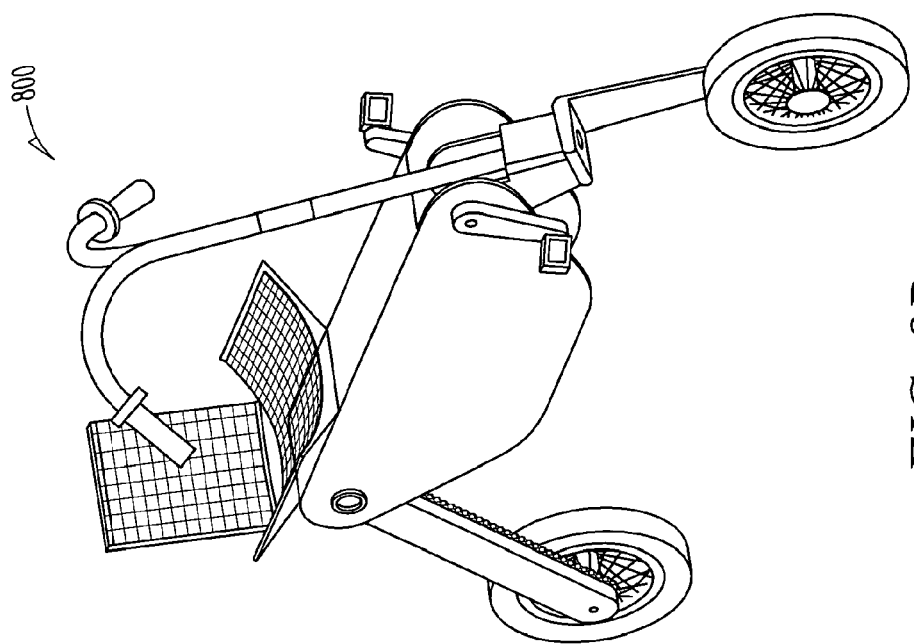
Figure 8A:
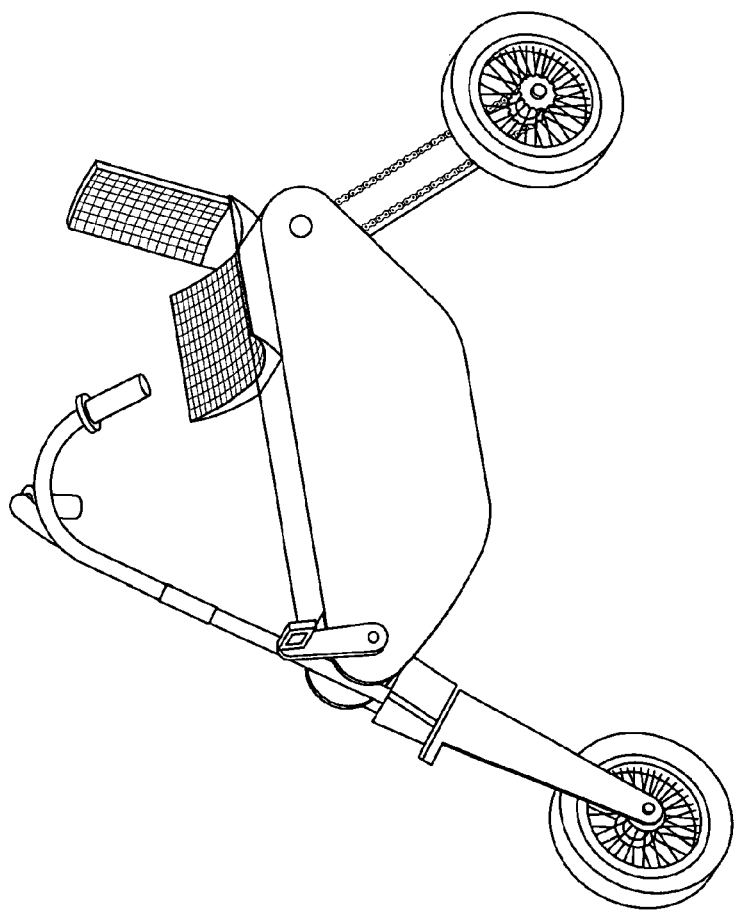
Figure 8D:
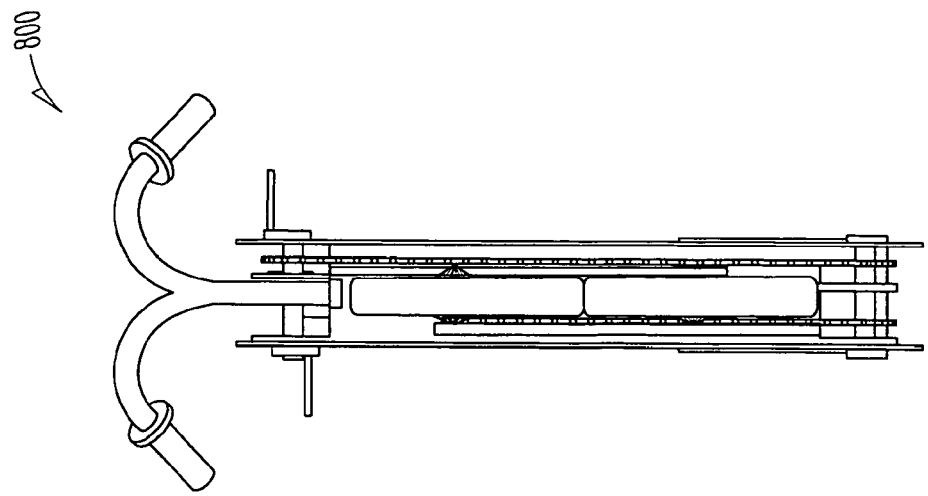
Figure 8C:
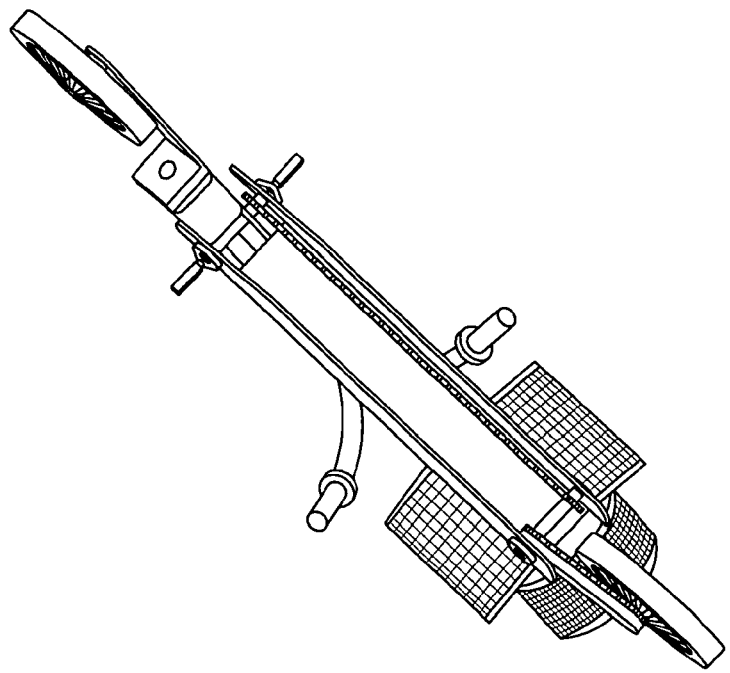

FIGS. 8A-8F illustrate a bicycle having a drive-and-chassis unit, according to some embodiments. FIGS. 8A and 8B illustrate front and side views of the bicycle 800. FIG. 8C illustrates a bottom view of the bicycle 800 in an open, operational configuration. FIG. 8D illustrates the bottom view of the bicycle 800 in a compact, collapsed configuration. FIG. 8E illustrates a cross-sectional rendering of the bicycle 800 in a partially collapsed configuration. FIG. 8F illustrations a side view of the bicycle 800 in a compact, collapsed configuration with all components collapsed and protected by the C-channel. In some embodiments, an additional feature of having skirts on each side of the C-channel that are long-enough to cover the entire diameter of the wheels, is that the bottom edges of the skirt can also function as a support base, allowing the collapsed vehicle to stand alone without additional support.

As described above, the vehicle can be motorized, in some embodiments. Likewise, one of skill will appreciate that there are multi-gear systems available that can be implemented in the vehicle. For example, such as multi-gear hub assemblies can replace traditional derailer-type assemblies and, in some embodiments, can be obtained from Nupace, Inc., Winston-Salem, N.C., USA.

Example 2

The vehicle can be manufactured and purchased as a kit that provides flexibility the type of vehicle, such that the vehicle can be transformed for additional uses. For example, the kit can comprise (i) three struts; (ii) a C-channel, (iii) a drive-and-steering unit; (iv) a drive-and-chassis unit; (v) a collapsible steering member; (vi) a collapsible seat; (v) a hub-motor; (vi) a battery set for the hub motor; (vii) a case for the battery set; (viii) a multi-gear hub; (ix) a utility box or deck for transporting items; (x) a tandem extension for an additional passenger; (xii) a harness for a hands-free carrying of the vehicle, or some combination thereof.

The kits could also come with instructions for assembly of the vehicles into various transformation modes. And, optionally, the kits could come with software, or other digital media, that may facilitate teaching a user how to operate and construct the systems.

The kits can be offered to provide much additional utility by offering the additional components. Having three struts allows for a transformation of a bicycle into a tricycle. Having the two different drive units allows for a transformation of one type to another, or use of both types. Having a hub motor allows for use of the vehicle by persons that would prefer, or require, motorized assistance in powering the vehicle, a transformation that would be useful for disable persons. Having a case for the battery set for an electric motor would also facilitate the re-charging of the batteries. The multi-gear hub would allow for use of the vehicle with a variety of gear ratios to better utilize drive power, whether human pedal power or electric motor power. The utility box or deck would allow for use of the vehicle as a work vehicle, and the tandem extension would allow for additional passengers, such as a child.

One of skill reading the teachings will appreciate that the concepts can extend into additional embodiments that go well-beyond a literal reading of the claims, the inventions recited by the claims, and the terms recited in the claims. It will be appreciated that the terms "operable," "configured," and like terms, can be used in connection with a function of the systems, components, or parts of the systems taught herein, such that the systems, components, or parts can be operable to function in a specified manner or configured to operate or function in a specified manner. Likewise, the phrase "operably attached to," "operably configured with," "in operable contact with," "in operable communication with," and like terms, can be used with to describe functional interrelationships between and within the vehicles, units, components, and the like, in the teachings provided herein. Such interrelationships can be direct, or indirect, such that an operable relationship can occur via a plurality of components that function together.

I claim:

1. A tri-fold chassis for a vehicle, comprising:
  a folding chassis assembly including a channel having a height ranging from about 4" to about 14" and operably attached to
  (i) a rotatably-lockable front strut supporting a front wheel assembly having a single front wheel, the front strut having a proximal end and a distal end, the proximal end of the front strut attaching to the channel at a rotatably-lockable front strut pivot; and
  (ii) a rotatably-lockable rear strut supporting a rear wheel assembly having a rear wheel, the rear strut having a proximal end and a distal end, the proximal end of the rear strut attaching to the channel at a rotatably-lockable rear strut pivot;
    wherein, the channel is configured for
    receiving the front strut and the rear strut upon a collapsing of the vehicle, the collapsing including rotating the rotatably-lockable front strut into the channel at the rotatably-lockable front strut pivot and rotating the rotatably-lockable rear strut into the channel at the rotatably-lockable rear strut pivot, the channel covering the entire diameter of the front wheel and the entire diameter of the rear wheel upon the collapsing.

2. A bicycle comprising the chassis of claim 1, the bicycle having
- a drive assembly with a crankshaft and a drive member that comprises a linkshaft;
- the front wheel assembly with the front wheel supported by the front strut; and,
- the rear wheel assembly with the rear wheel supported by the rear strut.

3. A bicycle comprising the chassis of claim 1, the bicycle having
- a drive assembly with a crankshaft and a drive member that comprises a chain;
- the front wheel assembly with the front wheel supported by the front strut; and,
- the rear wheel assembly with the rear wheel supported by the rear strut.

4. A bicycle comprising the chassis of claim 1, the bicycle having
- a drive assembly with a crankshaft and a drive member that comprises a belt;
- the front wheel assembly with the front wheel supported by the front strut; and,
- the rear wheel assembly with the rear wheel supported by the rear strut.

5. The chassis of claim 1, wherein the front strut is releasably-lockable in a plurality of positions.

6. The chassis of claim 1, wherein the rear strut is releasably-lockable in a plurality of positions.

7. The chassis of claim 1, wherein the front strut is a unifork, and the rear strut is a unifork that is complementary in shape to the front strut, such that the front strut and the rear strut into the chassis in a complementary configuration.

8. A bicycle comprising the chassis of claim 1, the bicycle having
- the front wheel assembly with the front wheel supported by the front strut;
- the rear wheel assembly with the rear wheel supported by the rear strut; and,
- a drive assembly with a crankshaft and a drive member, wherein the drive assembly including a pair of pedals attached to a pair of crankarms, the pair of crankarms attached to a crankshaft, the crankshaft having a crank axis that rotates under a pedal power in a fixed position in the chassis, the crankshaft in an operable communication with the drive member, the drive member in an operable communication with the rear wheel; wherein,
- the chassis functions as a protective casing for the crankshaft, the drive member, the front strut, the front wheel assembly, the rear strut, and the rear wheel assembly during a collapse of the bicycle.

9. A bicycle comprising the chassis of claim 1, the bicycle having
- the front wheel assembly with the front wheel supported by the front strut;
- the rear wheel assembly with the rear wheel supported by the rear strut; and,
- a drive assembly including a crankshaft having a crank axis and a first sprocket, the crankshaft in an operable communication with a chain set having a roller chain and a second sprocket having a second sprocket axis, the chain set in an operable communication with a wheel assembly having a wheel and a third sprocket, the drive assembly transferring a power from the crankshaft to drive the wheel.

10. A bicycle comprising the chassis of claim 1, the bicycle having
- the front wheel assembly with the front wheel supported by the front strut;
- the rear wheel assembly with the rear wheel supported by the rear strut; and, a drive assembly including a pair of pedals attached to a pair of crankarms, the pair of crankarms attached to a crankshaft, the crankshaft having a crank axis and a first sprocket, the crankshaft in an operable communication with a chain set, the chain set in an operable communication with a wheel assembly having a wheel, and a third sprocket, the drive assembly transferring a pedal power from the crankshaft to drive the wheel;
- wherein,
- the front strut is a unifork, the rear strut is a unifork that is complementary in shape to the front strut, such that the front strut, the front wheel assembly, the rear strut, and the rear wheel assembly collapse into the chassis in a complementary configuration to form a compact, carry-on bicycle.

11. The bicycle of claim 9, wherein the front strut is releasably-lockable in a plurality of positions.

12. The bicycle of claim 9, wherein the rear strut is releasably-lockable in a plurality of positions.

13. The bicycle of claim 9, wherein the front strut is a unifork, the rear strut is a unifork that is complementary in shape to the front strut, such that the front strut, the front wheel assembly, the rear strut, and the rear wheel assembly collapse into the chassis in a complementary configuration to form a compact, carry-on bicycle.

14. The bicycle of claim 9, wherein the chassis functions as a protective casing for the crankshaft, and the chain set during an operation of the bicycle.

15. The bicycle of claim 9, wherein the chassis functions as a protective casing for the crankshaft, the chain set, the front strut, the front wheel assembly, the rear strut, and the rear wheel assembly during a collapse of the bicycle.

16. The bicycle of claim 10, wherein the front strut is releasably-lockable in a plurality of positions.

17. The bicycle of claim 10, wherein the rear strut is releasably-lockable in a plurality of positions.

18. The bicycle of claim 10, wherein the steering member is a collapsibly lockable handlebar.

19. The bicycle of claim 10, further comprising a collapsibly lockable seat.

20. The bicycle of claim 10, wherein the chassis functions as a protective casing for the crankshaft, and the chain set during an operation of the bicycle.

21. The bicycle of claim 10, wherein the chassis functions as a protective casing for the crankshaft, the chain set, the front strut, the front wheel assembly, the rear strut, and the rear wheel assembly during a collapse of the bicycle; and, the central axis of the crankshaft is concentric with the central axis of the front strut pivot.

* * * * *